(12) United States Patent  
Weber

(10) Patent No.: US 9,158,155 B2  
(45) Date of Patent: Oct. 13, 2015

(54) IMMERSED REFLECTIVE POLARIZER WITH HIGH OFF-AXIS REFLECTIVITY

(75) Inventor: Michael F. Weber, Shoreview, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 380 days.

(21) Appl. No.: 13/503,320

(22) PCT Filed: Oct. 22, 2010

(86) PCT No.: PCT/US2010/053751  
§ 371 (c)(1),  
(2), (4) Date: Apr. 20, 2012

(87) PCT Pub. No.: WO2011/050268  
PCT Pub. Date: Apr. 28, 2011

(65) Prior Publication Data  
US 2012/0206806 A1    Aug. 16, 2012

Related U.S. Application Data

(60) Provisional application No. 61/254,691, filed on Oct. 24, 2009.

(51) Int. Cl.  
*G02B 5/30* (2006.01)  
*G02F 1/1335* (2006.01)

(52) U.S. Cl.  
CPC ............ *G02F 1/13362* (2013.01); *G02B 5/305* (2013.01)

(58) Field of Classification Search  
CPC .. G02B 27/286; G02B 27/287; G02B 27/288; G02B 5/3083  
USPC ........ 359/485.03, 489.11–489.13; 349/96–98  
See application file for complete search history.

(56) References Cited

U.S. PATENT DOCUMENTS

| 3,610,729 | A | | 10/1971 | Rogers | |
| 4,446,305 | A | | 5/1984 | Rogers | |
| 5,486,949 | A | | 1/1996 | Schrenk | |
| 5,751,385 | A | * | 5/1998 | Heinze | ........................... 349/61 |
| 5,770,306 | A | * | 6/1998 | Suzuki et al. | ................. 428/328 |
| 5,882,774 | A | | 3/1999 | Jonza | |

(Continued)

FOREIGN PATENT DOCUMENTS

| JP | 2004-151550 | 5/2004 |
| WO | WO 00/31572 | 6/2000 |

(Continued)

OTHER PUBLICATIONS

Azzam, "Reflection and Transmission of Polarized Light", Ellipsometry and Polarized Light, Published by North-Holland Publishing Company, 1977, 9 pages.

(Continued)

*Primary Examiner* — Frank Font  
(74) *Attorney, Agent, or Firm* — Jay R. Pralle; Lisa P. Fulton

(57) ABSTRACT

A film construction (320) includes a broad band reflective polarizing film (312) that may be immersed in an ultra low refractive index medium (322, 324). The reflecting polarizing film is characterized by a pass axis and a block axis, and its reflectivity for white light of the pass state polarization increases with increasing incidence angle to provide a compressed or narrowed viewing cone in one or two planes.

8 Claims, 15 Drawing Sheets

(56) References Cited

U.S. PATENT DOCUMENTS

| | | |
|---|---|---|
| 6,157,490 A | 12/2000 | Wheatley |
| 6,352,761 B1 | 3/2002 | Hebrink |
| 6,783,349 B2 | 8/2004 | Neavin |
| 7,123,418 B2 | 10/2006 | Weber |
| 8,035,774 B2 * | 10/2011 | Ouderkirk et al. ............ 349/96 |
| 2006/0082699 A1 | 4/2006 | Gehlsen |
| 2008/0037127 A1 | 2/2008 | Weber |
| 2010/0156953 A1 | 6/2010 | Nevitt |
| 2010/0238686 A1 | 9/2010 | Weber |
| 2010/0265584 A1 | 10/2010 | Coggio |
| 2012/0021134 A1 | 1/2012 | Kolb |
| 2012/0026431 A1 | 2/2012 | Coggio |
| 2012/0027945 A1 | 2/2012 | Kolb |
| 2012/0038850 A1 | 2/2012 | Hao |
| 2012/0038990 A1 | 2/2012 | Hao |
| 2012/0039089 A1 | 2/2012 | Hao |

FOREIGN PATENT DOCUMENTS

| | | |
|---|---|---|
| WO | WO 2007/115040 | 10/2007 |
| WO | WO 2008-144656 | 11/2008 |
| WO | WO 2009/123928 | 10/2009 |
| WO | WO 2010-120971 | 10/2010 |
| WO | WO 2011-049751 | 4/2011 |
| WO | WO 2011-050226 | 4/2011 |
| WO | WO 2011-050228 | 4/2011 |
| WO | WO 2011-050232 | 4/2011 |
| WO | WO 2011-129848 | 10/2011 |

OTHER PUBLICATIONS

Berremen, "Bragg Reflection of Light From Single-Domain Cholesteric Liquid-Crystal Films", Physical Review letters, 1970, vol. 25, No. 9, pp. 577-581.

* cited by examiner

IMMERSED REFLECTIVE POLARIZER WITH HIGH OFF-AXIS REFLECTIVITY

CROSS REFERENCE TO RELATED APPLICATIONS

This application is a national stage filing under 35 U.S.C. 371 of PCT/US2010/053751, filed on Oct. 22, 2010, which claims priority to U.S. Provisional Application No. 61/254,691, filed on Oct. 24, 2009, the disclosure of which is incorporated by reference in its/their entirety herein.

FIELD OF THE INVENTION

This invention relates generally to optical films whose reflection and transmission characteristics are determined in large part by constructive and destructive interference of light reflected from interfaces between microlayers within the film, with particular application to combinations of such films with other components, such as components suitable for use in display systems. The invention also relates to associated articles, systems, and methods.

BACKGROUND

Reflective polarizers composed of a plurality of microlayers whose in-plane refractive indices are selected to provide a substantial refractive index mismatch between adjacent microlayers along an in-plane block axis and a substantial refractive index match between adjacent microlayers along an in-plane pass axis, with a sufficient number of layers to ensure high reflectivity for normally incident light polarized along the block axis while maintaining low reflectivity and high transmission for normally incident light polarized along the pass axis, have been known for some time. See, e.g., U.S. Pat. No. 3,610,729 (Rogers), U.S. Pat. No. 4,446,305 (Rogers et al.), and U.S. Pat. No. 5,486,949 (Schrenk et al.).

More recently, researchers from 3M Company have pointed out the significance of layer-to-layer refractive index characteristics of such films along the direction perpendicular to the film, i.e. the z-axis, and shown how these characteristics play an important role in the reflectivity and transmission of the films at oblique angles of incidence. See, e.g., U.S. Pat. No. 5,882,774 (Jonza et al.). Jonza et al. teach, among other things, how a z-axis mismatch in refractive index between adjacent microlayers, more briefly termed the z-index mismatch or $\Delta n_z$, can be tailored to allow the construction of multilayer stacks for which the Brewster angle—the angle at which reflectance of p-polarized light at an interface goes to zero—is very large or is nonexistent. This in turn allows for the construction of multilayer mirrors and polarizers whose interfacial reflectivity for p-polarized light decreases slowly with increasing angle of incidence, or is independent of angle of incidence, or increases with angle of incidence away from the normal direction. As a result, multilayer films having high reflectivity for both s- and p-polarized light for any incident direction in the case of mirrors, and for the selected direction in the case of polarizers, over a wide bandwidth, can be achieved.

BRIEF SUMMARY

We have developed optical films capable of exhibiting reflective polarizer-like characteristics for normally incident light and high reflectivity mirror-like characteristics for obliquely incident light. These characteristics can be provided for broadband light, e.g., visible light extending over the visible spectrum. Moreover, the films desirably exhibit these characteristics even when used in laminated constructions wherein the film is joined to another optical component or components with no air gap, such that the film is "immersed" in a material of refractive index greater than 1 and light can propagate through the film at supercritical angles, i.e., angles that are more oblique than the critical angle for air. One component of such a construction is preferably an optically thick "ultra low index" (ULI) layer. The ULI layer may have a refractive index over visible wavelengths in a range from 1.1 to 1.3, or from 1.15 to 1.25, for example. The construction may include other optical components such as a diffuser, light guide, and/or display panel, or elements thereof.

Such an optical film and laminated construction may, if desired, be used in a display to selectively transmit broadband light traveling in an axial or near-axial direction and having a pass state polarization, while substantially reflecting broadband light of the pass state traveling at highly oblique angles, and reflecting broadband light having a block state polarization traveling at any angle, over a large area. Confining transmitted light of the pass state to a relatively narrow or compressed cone of propagation angles corresponding to axial or near-axial directions can advantageously be used to enhance axial brightness and contrast ratio of the display, particularly when the film or laminate is used in a recycling cavity or system such that at least some of the reflected light, whether of the pass state or block state, can be reflected by another component and converted to axial or near-axial light of the pass state.

Combining one or more optical film with other display components in a laminated construction can be advantageous for display manufacturers and suppliers in a number of ways, e.g., accelerating and simplifying the manufacturing process, reducing inventory, and reducing cost. However, eliminating the air layer that normally contacts the major surfaces of an optical film, and replacing that air layer with other optical media in which the optical film becomes "immersed", can pose design challenges. Snell's law no longer operates to prevent the propagation of light through the film at supercritical angles. An ultra low index (ULI) coating or other optically thick layer can approximate an air gap, but such a layer still effectively allows light to propagate a range of supercritical angles The present application therefore discloses, inter alia, a film construction that includes a plurality of microlayers and an optically thick low index layer. The plurality of microlayers can be configured to selectively transmit and reflect light as a function of angle and polarization over an extended wavelength region including visible wavelengths, the microlayers defining a pass axis for normally incident visible light of a first polarization and a block axis for normally incident visible light of a second polarization. The microlayers are also preferably characterized by increased reflectivity at oblique angles so as to transmit visible light of the first polarization in a compressed viewing cone. The optically thick low index layer preferably has an ultra low refractive index, e.g., from 1.1 to 1.3, or from 1.15 to 1.25, and is coupled to the microlayers in such a way as to limit propagation of highly oblique light in the microlayers (e.g. in cases where the low index layer is disposed between the microlayers and the source of highly oblique light), or to redirect such highly oblique propagating light back towards the microlayers (e.g. in cases where the microlayers are disposed between the low index layer and the source of highly oblique light).

The application also discloses a film construction that includes a multilayer optical film, and an optically thick low index layer attached to the multilayer optical film. The optical film is preferably configured to operate substantially as a reflective polarizer for visible light at normal incidence and to operate substantially as a mirror for visible light at oblique angles. The optically thick low index layer is preferably characterized by an ultra low refractive index, e.g., a refractive index in a range from 1.1 to 1.3, or from 1.15 to 1.25, for example, for visible wavelengths.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Most optical films that are suitable for use in displays, backlights, luminaires, and the like have optical transmission and reflection characteristics that change with the angle of incidence of light. Multilayer optical films, for example, which comprise a plurality of microlayers that are sufficiently thin so that some light is reflected from a plurality of the microlayer interfaces to undergo constructive or destructive interference to provide the desired reflective or transmissive properties, are specifically designed for a particular range of entrance and/or exit angles in a particular medium—typically air. Similarly, surface structured films, such as prismatic brightness enhancement films, are also specifically designed for a particular range of entrance and/or exit angles in air. For given incidence angles in air, propagation angles and exit angles for such optical films are determined by well known formulas such as Snell's law for refraction or other formulas such as those for diffractive gratings.

Many optical films used in liquid crystal display (LCD) applications are designed for use in air, i.e., light impinges from air on a first major surface of the film over a range of entrance angles, and light emerges from a second major surface of the film into air over a range of exit angles, and one or both of the entrance or exit angles cover a range from 0° to 90° in air. Such a film can be said to be "optically immersed" in air. This may be true even if it is difficult for the unaided eye to observe any air layer. For example, if one optical film is laid atop another optical film, it may appear to the unaided eye that the two films are in substantial contact over their entire major surfaces. Often, however, such films contact each other only at a finite number of points, and an optically thick air gap—i.e., one whose thickness is substantially greater than the wavelength of light of interest—is substantially maintained between the major surfaces of the films.

Market forces for reducing cost of LCD displays and other products, and/or for design enhancements such as reduced product thickness, may lead to a desire to identify and eliminate unnecessary components and to combine individual components into one or more packaged sets. In the case of optical films, such a desire may lead to an attempt to affix or attach the optical film to one or more other films or system components to form a laminate construction, wherein substantially no air gap exists between the elements of the laminate.

Figure 1:
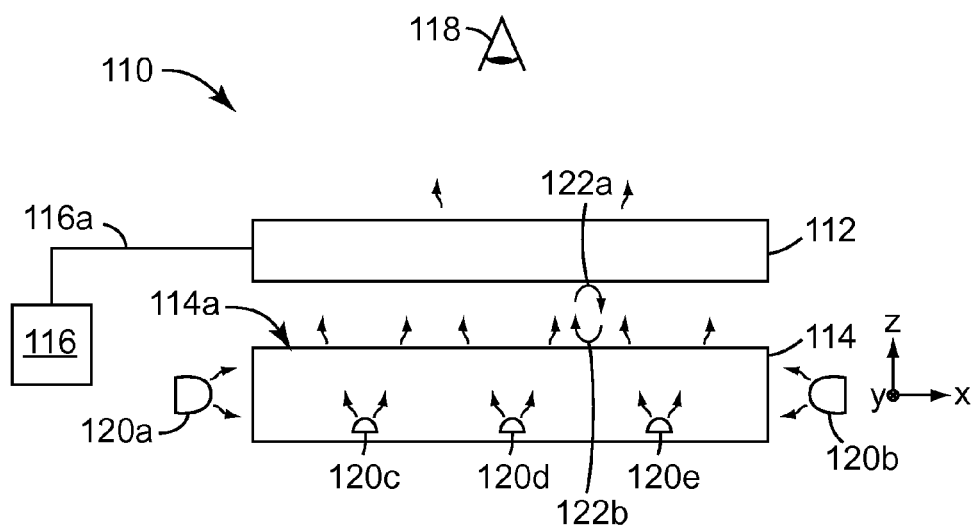
FIG. 1 is a schematic side view of a display system.

FIG. 1 shows a schematic side view of a typical display system 110 that includes a display assembly 112 and a backlight 114, within the context of a Cartesian x-y-z coordinate system for ease of reference. If the system 110 is an LCD, the display assembly 112 may include a liquid crystal (LC) display panel sandwiched between a front and back absorbing polarizer, the LC display panel further including glass panel plates between which liquid crystal material is disposed with an array of electrode structures and a color filter grid to form individually addressable picture elements (pixels). A controller 116 couples to the display assembly 112 via connection 116a to drive the electrode structures appropriately to produce a suitable image that can be perceived by an observer 118. The backlight 114 may be of the "edge lit" variety, in which case one or more LEDs, cold cathode fluorescent lamps (CCFLs), or other suitable light sources 120a, 120b are positioned along one or more edges or borders of the backlight, outside of the viewing area thereof. Alternatively, the backlight may be of the "direct lit" variety, in which case one or more such light sources 120c, 120d, 120e may be positioned in the viewing area behind a diffuser plate or other suitable element. In any event, the backlight 114 provides light over a large output area 114a corresponding to the viewing area of the display assembly 112. The light provided by the backlight is typically white, i.e., it includes an appropriate balance of red, green, and blue spectral components (or other suitable mix of spectral components) so that it appears at least nominally white to an observer.

The display system 110 also typically includes one or more optical films or other components between the display assembly 112 and the backlight 114 or elsewhere in the system. Depending on the type of display system, such components may include one or more polarizer (including e.g. absorptive polarizers and/or reflective polarizers), diffuser (including e.g. diffuser plates, gain diffusers, volume diffusers, and/or surface diffusers), and/or prismatic brightness enhancement film (including e.g. any of the wide variety of Vikuiti™ BEF products offered by 3M Company, St. Paul, Minn., USA), for example. Such films are often used to enhance the efficiency and/or brightness of the display system by reflecting "unusable light" (i.e., light that would not contribute to the desired system output, whether because it is of a polarization that would be absorbed by a rear absorbing polarizer in the display assembly 112 or because it is propagating at an unsuitable angle) away from the display assembly, and then redirecting some of that reflected light back towards the display assembly as "useable light" (i.e., light that can contribute to the system output) via a diffuse, specular, or semi-specular reflector, for example. Such reflection and re-direction of the light provides for at least some degree of light recycling in the display system, which recycling is indicated generally by arrows 122a, 122b.

Figure 2:
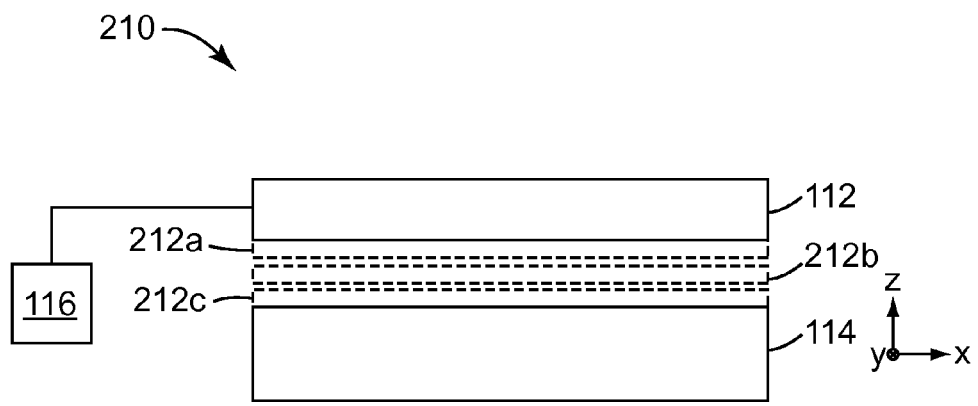
FIG. 2 is a schematic side view of the system of FIG. 1 which has been modified by the addition of laminates and/or films as disclosed herein.

The films and components normally located between the display assembly 112 and backlight 114, or disposed elsewhere, are candidates for use in the laminate constructions discussed above that are devoid of air gaps. Such laminate constructions are depicted generally in the display system 210 of FIG. 2. Except for the laminate constructions, the system 210 may be substantially identical to the system 110 of FIG. 1 including its various permutations discussed above, and like reference numerals are used to refer to like elements with no further description provided for brevity. The display system of FIG. 2, however, joins one or more optical films to other films or components with no air gap to provide one or more laminates 212a, 212b, 212c as shown. In the figure, laminate 212a attaches to the display assembly 112 (or a component thereof) with no air gap, and laminate 212c attaches to the backlight 114 (or a component thereof) with no air gap. In some cases, a laminate 212b may be provided that attaches one or more optical films to other film(s) or component(s) with no air gap therebetween, but that may be spaced apart from both the display assembly and the backlight via an air gap.

Depending on the types of optical films to be included in the laminates, the elimination of an air interface or air gap may or may not pose a problem for the operation of the optical film. In cases where each film or component to be joined does not substantially scatter or otherwise redirect light in the process of entering or after it enters one major surface and before it exits the other major surface of the film, the film may continue to function as it did before lamination, i.e., before elimination of the air gap. However, when the light enters the film through a non-planar surface, or through a surface that is not parallel to the film, the film may not function properly. One example of this is BEF prisms coated onto Vikuiti™ DBEF multilayer reflective polarizing film. Both the BEF prismatic film and the DBEF film are designed for use in air, but no loss of functionality occurs when the air gap is eliminated by optically coupling the planar surfaces of both films with e.g. an optical adhesive. Another example is a Vikuiti™ DBEF film laminated to an absorbing polarizer film. In both of these examples, the elimination of the air gap does not substantially affect the angular distribution of light that propagates through the affected films. Stated differently, each optical film in the laminate construction can said to be optically immersed in air, even though its major surfaces may not be in contact with air. This is explained further below in connection with FIGS. 3a-c.

In other cases, at least one film or component that generates highly oblique light is provided in the laminate, and the elimination of the air gap in combination with such highly oblique light has the effect of causing "supercritical" light to propagate through an optical film of interest and exit the laminate in such a way as to degrade system performance. By "supercritical" light we mean light that travels through the film at an angle that is more oblique than can be achieved by illumination from air using a flat, smooth air/film interface. Thus, when a film is optically immersed in air, the maximum angle of incidence for light impinging on the major surface of the film from air is 90 degrees. Such grazing incidence light is refracted into the film at the critical angle, $\theta_c$, which is a function of the refractive index of the film. The critical angle is typically the most oblique angle at which light would propagate within the film. For laminate constructions that allow supercritical light to propagate through the optical film and eventually emerge from the laminate construction, the optical film can be said to be optically immersed in a medium of higher refractive index than air. This is explained further below in connection with FIG. 3c. In the context of the present application, a film or component that is described as being "optically immersed" is assumed to be optically immersed in a medium whose refractive index is greater than that of air, unless otherwise indicated.

Such a situation can occur when laminating a BEF prismatic film to the diffuser plate of a backlight, or to an LCD panel, for example, using a conventional optical adhesive having an index of refraction near 1.5. In both cases the entrance and exit angles for the BEF film are dramatically affected by the refractive index of the laminating adhesive, which is significantly different from that of air. This situation can also occur when a diffuser is laminated with a conventional optical adhesive to one side of a reflective polarizer, the other side of which is then laminated to an LCD panel. In this case the optical adhesive transmits highly oblique light produced within the diffuser into the reflective polarizer as supercritical light, which may be further transmitted into the LCD panel. Since neither the reflective polarizer nor the LCD panel are typically designed to accommodate such highly oblique light, this can result in degraded performance by the polarizer and large amounts of internally scattered light within the LCD panel, which in turn may result in much lower display contrast and brightness. Even if the reflective polarizing film is redesigned to handle a larger range of incidence angles, such as by substantially widening the already broad reflection band of a multilayer stack reflective polarizer (e.g. by increasing the number of microlayers and extending the upper limit of the thickness gradient that characterizes the microlayers), such a redesigned film will continue to transmit the pass axis polarization of light through the larger ranges of angles and the problems cited will remain unsolved.

In order to minimize problems associated with supercritical light propagation in laminate constructions, it would be desirable to utilize a material layer that, from an optical design standpoint, resembles an air gap as closely as possible, e.g., a material layer that is both highly transmissive to light for light paths that are optically thick, and whose refractive index is close to 1.0. Stated differently, there is a need for a means to physically attach transmissive optical components in a surface-to-surface mode while still restricting the angles of entrance and exit to those comparable to air. Ultra-low index films with good mechanical integrity and low haze have recently been developed. Such films can be coated onto almost any optical film, so as to approximate an air gap, and then any conventional optical adhesive can be applied to join the coated film with another component in the system. Suitable ultra low index materials are described in, for example, the following U.S. patent applications which are incorporated herein in their entireties by reference: "Optical Film" filed on Apr. 15, 2009 and having Ser. No. 61/169,466; "Optical Construction and Display System Incorporating Same" filed on Apr. 15, 2009 and having Ser. No. 61/169,521; "Retroreflecting Optical Construction" filed on Apr. 15, 2009 and having Ser. No. 61/169,532; "Optical Film for Preventing Optical Coupling" filed on Apr. 15, 2009 and having Ser. No. 61/169,549; "Backlight and Display System Incorporating Same" filed on Apr. 15, 2009 and having Ser. No. 61/169,555; "Process and Apparatus for Coating with Reduced Defects" filed on Apr. 15, 2009 and having Ser. No. 61/169,427; "Process and Apparatus for A Nanovoided Article" filed on Apr. 15, 2009 and having Ser. No. 61/169,429; and "Optical Construction and Method of Making the Same" filed on Oct. 22, 2009 and having Ser. No. 61/254,243. Ultra-low index materials can also be made using a gel type of fumed silica. The ultra-low index material may have a refractive index over visible wavelengths in a range from 1.1-1.3, or from 1.15 to 1.25, for example. As discussed further below, the ultra-low index material may also exhibit a gradient in refractive index. For example, the material may be in the form of a gradient film or layer comprising a binder and a plurality of particles, wherein a weight ratio of the binder to the plurality of the particles is not less than about 1:2. The gradient optical film may further include a plurality of interconnected voids having a local volume fraction, wherein the local volume fraction of the plurality of interconnected voids varies along a thickness direction of the film so as to provide a local refractive index within the film that changes along such thickness direction. Reference is made to U.S. patent application Ser. No. 61/254,673, "GRADIENT LOW INDEX ARTICLE AND METHOD", and U.S. patent application Ser. No. 61/254,674, "PROCESS FOR GRADIENT NANOVOIDED ARTICLE", both filed on even date herewith and incorporated herein by reference.

Such ultra-low refractive index materials can be used in laminates that include angle-sensitive optical films so that such films can be mechanically and optically coupled to other films or components while minimizing the deleterious effects of supercritical light propagation. However, even when using one or more such ultra-low index material layer in a laminate construction, the effects of supercritical light propagation can still play an important part in system performance, and indeed can substantially degrade system performance unless design aspects of the multilayer optical film(s) and/or of other angle-sensitive optical films are properly handled.

Figure 3A:
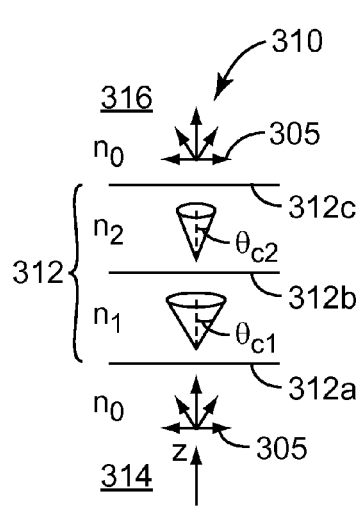
FIGS. 3a-c are a series of schematic side views of a simplified layered film to which other layers are applied, demonstrating the concept of immersing the film in a given optical medium.
Figure 3B:
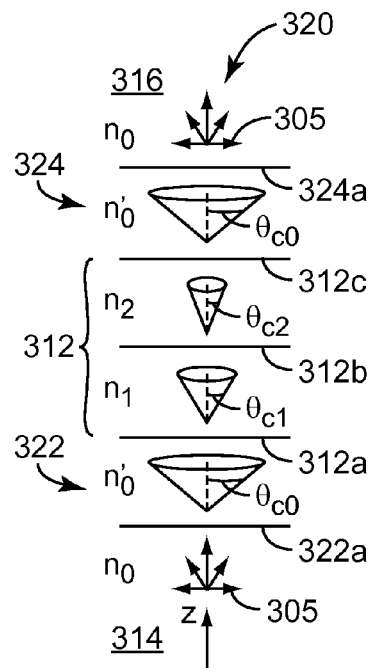
Figure 3C:
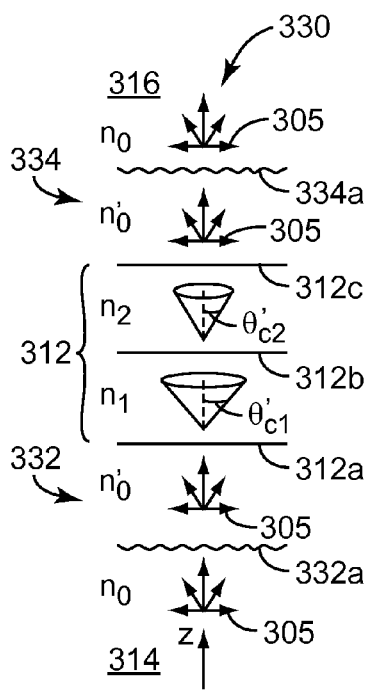

Before discussing specific design considerations for multilayer reflective polarizing films used in laminates that support supercritical light propagation, we turn to FIGS. 3a-c to illustrate the concept of optically immersing a film in a medium other than air.

FIGS. 3a-c are a series of schematic side views of a simplified layered film to which other layers are applied, demonstrating the concept of immersing the film in an optical medium. In FIG. 3a, an elementary film construction 310 consists essentially of a layered film 312 exposed on both sides to a medium of refractive index $n_0$, which is assumed to be air ($n_0$=1.0). For ease of discussion, $n_0$ and the other refractive indices shown in these FIGS. 3a-c are assumed to be isotropic. Furthermore, the film 312 is illustrated as having only two layers: a first layer of a conventional low refractive index optical material, such as a polymer whose refractive index $n_1$ is of the order of 1.5 or above; and a second layer of a conventional higher refractive index optical material, such as a different polymer whose refractive index $n_2$ is also of the order of 1.5 or above, but $n_2$ is substantially greater than $n_1$. The film 312 has a first major surface 312a, a surface or interface 312b that separates the first and second layers, and a second major surface 312c. The surface 312a is exposed to a thick layer 314 of air, and the surface 312c is exposed to another thick layer 316 of air.

Still referring to FIG. 3a, light is incident on the film 312 from below, i.e., from the layer 314 of air. The incident light travels roughly along the depicted z-axis, which may be perpendicular to the thickness dimension of the film 312, but the incident light includes the widest possible range of light ray propagation directions, including rays directed parallel to the z-axis, rays directed at moderate oblique angles to the z-axis, and rays directed at extreme oblique angles that are virtually perpendicular to the z-axis such that they strike surface 312a at glancing incidence. This widest possible range of incidence angles is represented by the 5-headed arrow symbol 305. In some cases the light distribution associated with symbol 305 may be quasi-Lambertian, while in others it may have a very different distribution. In any case the light distribution of symbol 305 includes some amount of light traveling in all directions over a hemisphere (or 2π solid angle) of possible paths. We now follow this incident light as it passes from the air layer 314, through the film 312, to the opposite air layer 316. In doing so, we concentrate on refraction at the various interfaces and, for simplicity, ignore reflection.

The surfaces 312a, 312b, 312c are all assumed to be flat and smooth, and perpendicular to the z-axis. Thus, when the incident light from the air layer 314 impinges on the major surface 312a, it refracts into the first layer of the film 312 according to Snell's law, i.e., $n_0 \sin \theta_0 = n_1 \sin \theta_1$. Since the incident light contains light rays whose incident angle ranges from $\theta_0$=0 to $\theta_0 \approx 90$ degrees, the refracted light will contain refracted light rays whose refracted angle, or angle of propagation, ranges from $\theta_1=0$ to $\theta_1=\theta_{c1}$, where $\theta_{c1}$ is the critical angle for the material of the first layer, i.e., $\theta_{c1}=\arcsin(1/n_1)$, since $\sin(90)=1$ and $n_0=1$. The collection of all refracted rays in the first layer is represented by the cone whose half-angle is $\theta_{c1}$.

The refracted light advances generally along the z-axis and encounters the surface or interface 312b, where a second refraction occurs as the light enters the second layer, whose refractive index is $n_2$. The second refraction again follows Snell's law, producing refracted light within the second layer over a range of propagation directions or angles $\theta_2$, where $\theta_2$ ranges from $\theta_2=0$ to $\theta_2=\theta_{c2}$. The angle $\theta_{c2}$ is the critical angle for the material of the second layer, i.e., $\theta_{c2}=\arcsin(1/n_2)$. The collection of all refracted rays in the second layer is represented by the cone whose half-angle is $\theta_{c2}$. Since the refractive index $n_2$ was assumed to be greater than refractive index $n_1$, the angle $\theta_{c2}$ is shown as being smaller than $\theta_{c1}$.

The refracted light in the second layer advances further until it encounters the major surface 312c. Here, another refraction occurs as the light passes from the second layer into the air layer 316. Again in accordance with Snell's law, the range of propagation angles $\theta_2$ for light in the second layer is transformed by refraction into a range of propagation angles for the air layer 316 that ranges from 0 to substantially 90 degrees, indicated again by symbol 305. Thus, in the process of traversing the film 312, hemispherically incident light from air is converted into conical distributions of light in the different material layers of the film, and then back again into hemispherically propagating light in the other air layer. The half-angle of the conical distributions in the material layers equals the critical angle of the respective material.

Turning now to FIG. 3b, we see there a schematic side view of another film construction 320. Film construction 320 includes the two-layered film 312 from FIG. 3a, but adds to it one layer of ultra low index material, having refractive index $n_o'$, on each side of the film 312 to produce the construction 320. The index $n_o'$ is greater than air but substantially less than the low index $n_1$. A first layer 322 of the index $n_o'$ material is applied to the surface 312a of the film 312, and a second layer 324 of the index $n_o'$ material is applied to the surface 312c of the film 312. The original film 312 in combination with the layers 322, 324 now form a new film having flat, smooth major surfaces 322a, 324a exposed to air, the surfaces 322a, 324a being parallel to the surfaces 312a-c.

Still referring to FIG. 3b, light is incident on the construction 320 from below, i.e., from the layer 314 of air. As in FIG. 3a, the incident light travels roughly along the z-axis but with rays spanning the widest possible range of incidence angles, again represented by the 5-headed arrow symbol 305. We follow this incident light as it passes from the air layer 314, through the different layers of the construction 320, to the opposite air layer 316.

When the incident light from the air layer 314 impinges on the major surface 322a, it refracts into the layer 322 of ultra-low index material according to Snell's law, i.e., $n_0 \sin\theta_0 = n_0' \sin\theta_0'$. Since the incident light contains light rays whose incident angle ranges from $\theta_0=0$ to $\theta_0 \approx 90$ degrees, the refracted light contains refracted light rays whose refracted angle, or angle of propagation, ranges from $\theta_0'=0$ to $\theta_0'=\theta_{c0}$, where $\theta_{c0}$ is the critical angle for the ultra-low index material, i.e., $\theta_{c0}=\arcsin(1/n_0')$. The collection of all refracted rays in the layer 322 is represented by the cone whose half-angle is $\theta_{c0}$.

This refracted light then advances through the remainder of the construction 320. As it does so, the cone of angles representing the range of propagation directions in each of the distinct layers is determined by Snell's law. In a straightforward manner, one can readily deduce that the half-angle of the cone of propagation directions changes from $\theta_{c0}$ to $\theta_{c1}$ to $\theta_{c2}$ to $\theta_{c0}$ as light advances from layer 322 to layer 324, as shown in FIG. 3b. Light that refracts from layer 324 into the air layer 316 is again refracted into the widest possible range of propagation angles 305.

Comparing FIGS. 3a and 3b, we see that the addition of the layers 322, 324 to the film 312 does nothing to change the range of propagation directions inside the film 312. For each of the two layers of the film 312, the half-angle of the propagation cone remains the same. Note that this result would be the same regardless of the refractive index used for layers 322, 324. Thus, despite the presence of the layers 322, 324 between the film 312 and air, we nevertheless characterize the film 312 as still being optically immersed in air.

Turning now to FIG. 3c, here we have a film construction 330 that is substantially the same as construction 330, except that the layers 322, 324 are replaced with layers 332, 334. The layers 332, 334 have the same ultra-low refractive index as layers 322, 324. However, the flat, smooth major surfaces 322a, 324a of FIG. 3b are replaced with roughened major surfaces 332a, 334a, which provide a significant diffusing effect. As a result, hemispherically distributed incident light rays impinging from the air layer 314 onto the major surface 332a are refracted and diffused at all propagation angles (see symbol 305) in the layer 332, rather than being confined to a cone of half-angle $\theta_{c0}$ as was the case in FIG. 3b. This expanded range of propagation angles in layer 332 produces, via Snell's law at interface 312a, a cone of propagation directions in the first layer of film 312 whose half-angle $\theta_{c1}'$ is substantially greater than the corresponding half-angle $\theta_{c1}$ from FIG. 3b. In particular, $\theta_{c1}'=\arcsin(n_0'/n_1)$. When this light passes into the second layer of film 312, it refracts at surface 312b to produce a cone of propagation directions in the second layer that is also expanded relative to the corresponding cone in FIG. 3b. The half-angle $\theta_{c2}'$ is computed according to $\theta_{c2}'=\arcsin(n_0'/n_2)$. This light is refracted at surface 312c into ultra-low index layer 334 at all angles via Snell's law, and this light in turn is refracted and diffused into the air layer 316 at all angles by virtue of the roughened major surface 334a.

Comparing FIG. 3c with FIGS. 3a and 3b, we see that light is able to propagate at more oblique angles in the layers of film 312 in the construction 330 compared to the constructions 320, 310. Since light is able to impinge upon the film 312 at all angles from ultra-low index layer 332, and since light that enters the film 312 at any such angle is able to exit the film via layers 334, 316, the film 312 in FIG. 3c can be said to be optically immersed in the ultra-low refractive index material of index $n_o'$.

Figure 4:
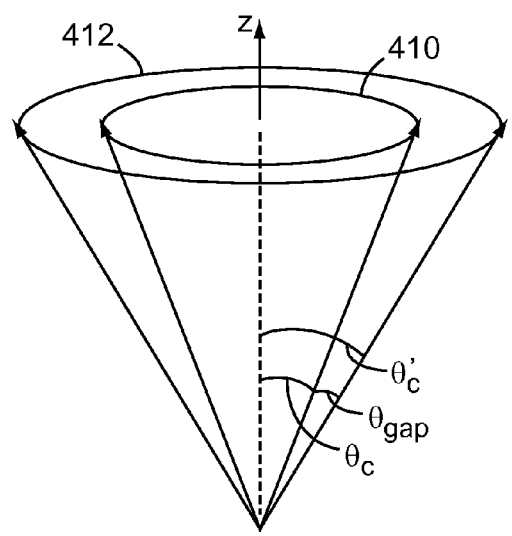
FIG. 4 is a perspective view of the angular range, or cone, of light propagation in a given layer, illustrating the widening of the cone when the layer is immersed in a medium other than air.

FIG. 4 is a perspective view of the angular range, or cone, of light propagation in a given layer, illustrating the widening of the cone when the layer is optically immersed in a medium other than air. Thus, the half-angle of the cone 410 is the critical angle $\theta_c$ for the layer material. This is the range of possible light propagation directions when the layer is optically immersed in air. The range of light propagation directions expands to the wider cone 412, of half angle $\theta_c'$, if the layer is optically immersed in a medium of refractive index greater than air. The difference between these two cones, or solid angles, is represented by the differential angle $\theta_{gap}$ in FIG. 4. Light whose propagation direction lies in this gap represents light for which the layer, or the film of which it is a part, may not be designed to handle.

We now shift our attention to multilayer optical films that can be used in the disclosed laminate constructions with one or more optically thick ultra-low refractive index layers, such that the multilayer optical film can be considered to be optically immersed in the ultra-low refractive index material. We begin with a broad description of the capabilities of multilayer optical films generally, and later describe specific design characteristics that allow a multilayer optical film to be used as an optically immersed reflective polarizer with oblique angle reflecting or collimating characteristics.

Figure 5:
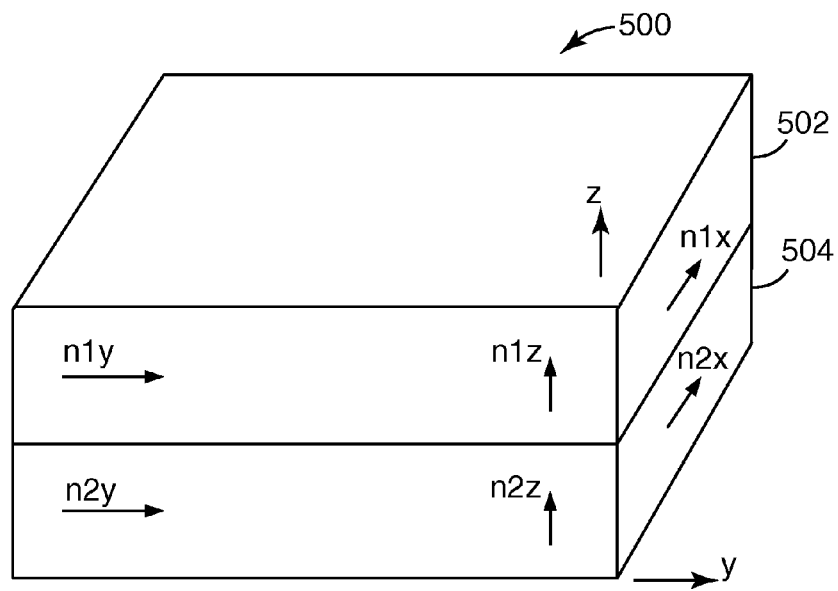
FIG. 5 is a schematic perspective view of a portion of a multilayer optical film.

FIG. 5 depicts only two layers of a multilayer optical film 500, which would typically include tens or hundreds of such layers arranged in one or more contiguous packets. The film 500 includes individual microlayers 502, 504. The microlayers have different refractive index characteristics so that some light is reflected at interfaces between adjacent microlayers. The microlayers are sufficiently thin so that light reflected at a plurality of the interfaces undergoes constructive or destructive interference to give the film the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 μm. Thicker layers can, however, also be included, such as skin layers at the outer surfaces of the film, or protective boundary layers disposed within the film that separate packets of microlayers.

The reflective and transmissive properties of multilayer optical film 500 are a function of the refractive indices of the respective microlayers, the total number of microlayers, and the thicknesses of the microlayers. Each microlayer can be characterized, at least in localized positions in the film, by in-plane refractive indices nx, ny, and a refractive index nz associated with a thickness axis of the film. These indices represent the refractive index of the subject material for light polarized along mutually orthogonal x-, y-, and z-axes, respectively (see FIG. 5).

In practice, the refractive indices are controlled by judicious materials selection and processing conditions. Film 500 can be made by co-extrusion of typically tens or hundreds of layers of two alternating polymers A, B, followed by optionally passing the multilayer extrudate through one or more multiplication die, and then stretching or otherwise orienting the extrudate to form a final film. The resulting film is composed of typically tens or hundreds of individual microlayers whose thicknesses and refractive indices are tailored to provide one or more reflection bands in desired region(s) of the spectrum, such as in the visible or near infrared. To achieve high reflectivities with a reasonable number of layers, adjacent microlayers can exhibit a difference in refractive index ($\Delta n_x$) for light polarized along the x-axis of at least 0.05, for example. If the high reflectivity is desired for two orthogonal polarizations, then the adjacent microlayers also can exhibit a difference in refractive index ($\Delta n_y$) for light polarized along the y-axis of at least 0.05, for example.

If desired, the refractive index difference ($\Delta n_z$) between adjacent microlayers for light polarized along the z-axis can also be tailored to achieve desirable reflectivity properties for the p-polarization component of obliquely incident light. For ease of explanation, at any point of interest on a multilayer optical film, the x-axis can be considered to be oriented within the plane of the film such that the magnitude of the in-plane $\Delta n$ is a maximum. Hence, the magnitude of $\Delta n_y$ may be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n = n_{1j} - n_{2j}$, where j=x, y, or z and where the layer designations 1, 2 are chosen so that $n_{1x} \geq n_{2x}$, i.e., $\Delta n_x \geq 0$.

To maintain near on-axis reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$. Alternatively, $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e., $\Delta n_z < 0$. This condition yields interfaces whose reflectivity for p-polarized light increases with increasing angles of incidence, as is the case for s-polarized light.

In order to provide for a polarizing film with Tblock (0) substantially less than Tpass(0) and to provide for a high reflectivity for both s-polarized and p-polarized light pass axis light with a reasonable number of layers, the film materials and indices can be tailored such that Δnx is greater than about 0.1, Δny is greater than about 0.05, and Δnz is less than about −0.05.

If the thicknesses of all of the microlayers in a given multilayer film were designed to be the same, the film would provide high reflectivity over only a narrow band of wavelengths. Such a film would appear highly colored if the band were located somewhere in the visible spectrum, and the color would change as a function of angle. In the context of display applications, films that exhibit noticeable colors are generally avoided, although in some cases it may be beneficial for a given optical film to introduce a small amount of color to correct for color imbalances elsewhere in the system. Multilayer films can be provided with broad band reflectivity and transmission, e.g. over the entire visible spectrum, by tailoring the microlayers—or more precisely, the optical repeat units, which typically correspond to pairs of adjacent microlayers—to have a range of optical thicknesses. Typically, the microlayers are arranged along the z-axis or thickness direction of the film from a thinnest optical repeat unit on one side of the film or packet to a thickest optical repeat unit on the other side, with the thinnest reflecting the shortest wavelengths in the reflection band and the longest reflecting the longest wavelengths. Further discussion of thickness gradients in multilayer optical films, including tailoring the thickness gradient to provide a sharpened band edge, is provided in U.S. Pat. No. 6,157,490 (Wheatley et al.).

The disclosed multilayer films desirably have a reflection band of sufficient bandwidth that they reflect light of wavelengths over most of the visible spectrum at most angles in the ultra-low index (ULI) medium. The visible spectrum appropriate to many displays and luminaries extends to about 630 nm for some systems, 650 nm for others, and as high as 670 nm for some of the highest color gamut systems. Due to the high Fresnel reflectivity near 90 degrees at any ULI/polymer interface, not much light will be transmitted at these highest angles. For this reason, the right band edge (RBE) of the pass axis of the film for p-polarized light is desirably above about 650 nm at θ=75 degrees in the ULI. For an index 1.2 ULI then, the minimum RBE for the pass axis of the film is desirably at least 950 nm at normal incidence. For improved contrast and color balance in an LCD display, the RBE of the pass axis of these films for p-polarized light is desirably above 1000 nm or above 1050 nm or as high as 1100 nm at normal incidence. If the ULI has an index of 1.15, the RBE of the pass axis for p-polarized light is desirably greater than at least about 900 nm, and more desirably greater than 950 nm or even 1000 nm at normal incidence. For indices of the ULI higher than either 1.15 or 1.2, the right band edges of the films are desirably made proportionately higher.

Multilayer optical films can be manufactured using any suitable technique. Typically, manufacture involves heating polymer materials above their melting or glass transition temperatures, feeding the molten polymers into a multilayer feedblock, optionally multiplying the layers using one or more layer multipliers, sending the molten material through a film extrusion die, casting the extrudate leaving the die onto a casting wheel, and stretching or otherwise orienting the cast film along one or two film directions. See, e.g., U.S. Pat. No. 5,882,774 (Jonza et al.) and U.S. Pat. No. 6,783,349 (Neavin et al.). In some embodiments, the films can be manufactured without the use of a layer multiplier. Although layer multipliers greatly simplify the generation of a large number of optical layers, they may impart distortions to each resultant packet of layers that are not identical for each packet. For this reason, any adjustment in the layer thickness profile of the layers generated in the feedblock is not the same for each packet, i.e., all packets cannot be simultaneously optimized to produce a uniform smooth spectrum free of spectral disruptions. Thus, an optimum profile, for low transmitted and reflected color, can be difficult to make using multipacket films manufactured using multipliers. If the number of layers in a single packet generated directly in a feedblock do not provide sufficient reflectivity, then two or more such films can be attached to increase the reflectivity. Further discussion of layer thickness control, so as to provide smooth spectral reflectivity and transmission for low color films, is provided in PCT publication WO 2008/144656 (Weber et al.).

The materials used in the manufacture of multilayer optical films are typically polymer materials that have very low absorption at least over visible and near-visible wavelengths and for typical optical path distances within the film. Thus, the % reflection R and the % transmission T of a multilayer film for a given light ray are typically substantially complementary, i.e., $R+T \approx 100\%$, usually within an accuracy of about 1%. Thus, unless otherwise noted, a multilayer optical film disclosed herein as having a high reflectivity can be assumed to have a low transmission, and vice versa, and a multilayer optical film disclosed as having a low reflectivity can be assumed to have a high transmission, and vice versa, and reported values of reflectivity or transmission can be assumed to also report on transmission or reflectivity, respectively, via the relationship $R+T \approx 100\%$.

Another issue to keep in mind when considering transmission and reflection characteristics of an optical film is the question of whether to take into account the contribution of surface reflections at the outermost front and back major surfaces of the film. Such surface reflections may be relatively minor at normal incidence, e.g., a total of about 10% reflectivity, but can become much greater at highly oblique angles and can differ greatly between s- and p-polarization components. In the case of the present application, the disclosed optical films are preferably, but not necessarily, intended for incorporation into a laminate construction, in which case at least one and possibly both of the outer major surfaces of the film will be in contact with an optical material rather than air. Consequently, unless otherwise noted, the reflection and transmission characteristics reported herein do not include the contribution of surface reflections at the outermost front and back major surfaces of the film. Such values are sometimes referred to as "internal reflection" and "internal transmission" to distinguish them from "external reflection" and "external transmission", which do include the contributions of the front and back surface reflectivities. However, even if the term "internal" is not used herein, the reflection and transmission characteristics discussed herein should be assumed to be the internal reflection and internal transmission values, unless otherwise noted.

The internal reflection and transmission characteristics can be readily determined whether one is dealing with a computer-modeled optical film or an actual film whose properties are measured in the laboratory. In the case of calculated values of reflectivity and transmission for a modeled film, this is readily accomplished by omitting the calculation of those surface reflectivities from the computed value. The reflection spectrum and all of its features such as the reflectivity at any angle and the band edges for birefringent multilayer films can be calculated using the 4×4 stack code of Berremen and Scheffer, Phys. Rev. Lett. 25, 577 (1970). A description of this method is given in the book "Ellipsometry and Polarized Light" written by Azzam and Bashara, published by Elsevier Science, Holland.

In the case of measured values of reflectivity or transmission, the internal reflection and transmission characteristics can be accomplished by taking measurements of the film in air and subtracting a calculated or measured value representative of only the surface reflectivities. For example, given a multilayer film having a smooth and clear surface layer which is much thicker than the microlayers, the index of refraction of this surface layer can be measured. Once the index of the surface layer is known, the surface reflectivity can be subtracted from the total measured reflectivity by using mathematical formulas which are well known in the art. This procedure works well at both normal incidence (0 degrees) as well as at higher angles such as 60 degrees in air. The reflectivity of the same film at 90 degrees in air or in a higher index medium such as index 1.2 of the examples can be directly measured by optically coupling glass prisms of a known index of refraction to both sides of the film and measuring the reflectivity at the appropriate angle which is easily determined with Snell's Law. Glass prisms with indices of about 1.5 to 1.7 are suitable for these measurements. The interfacial reflections between such glass prisms and these polymeric films are small at angles near 45 degrees, but they can be easily calculated if necessary for a more accurate measurement of the internal reflectivity of a multilayer optical film.

It is often easier to accurately measure transmission instead of reflection of a film, especially at non-zero angles. Since the absorption of light is relatively small in the films of interest (generally less than 1% for normally incident light), one can simply measure the transmissivity value T and assume that $R=1-T$. If the absorption is greater than about a few percent, then it can be measured at normal incidence by separate measurements of R and T. The absorbance at higher angles can then be readily estimated, whereupon reflectivity can be calculated as $R=1-A-T$, where R, A, and T are typically expressed as percentages and $1=100\%$.

Multilayer optical films disclosed herein exhibit polarizing characteristics for normally incident light and various reflection and transmission characteristics for highly oblique light. The discussion of these characteristics requires reference to parameters referred to variously as a "pass" polarization (and "pass" axis, "pass" plane, etc.), a "block" polarization (and "block" axis, "block" plane, etc.), an s-polarization, and a p-polarization. For purposes of clarity and to help the reader to avoid confusing these terms, we now provide a detailed discussion of these terms.

In reference to traditional polarizing films, light can be considered to be polarized in two orthogonal planes, where the electric vector of the light, which is transverse to the propagation of the light, lies within a particular plane of polarization. In addition, the polarization state of a given light ray can be resolved into two different polarization components: p-polarized and s-polarized light. P-pol light is light that is polarized in the plane of incidence of the light ray and a given surface, where the plane of incidence is a plane containing both the local surface normal vector and the light ray propagation direction or vector.

Figure 6:
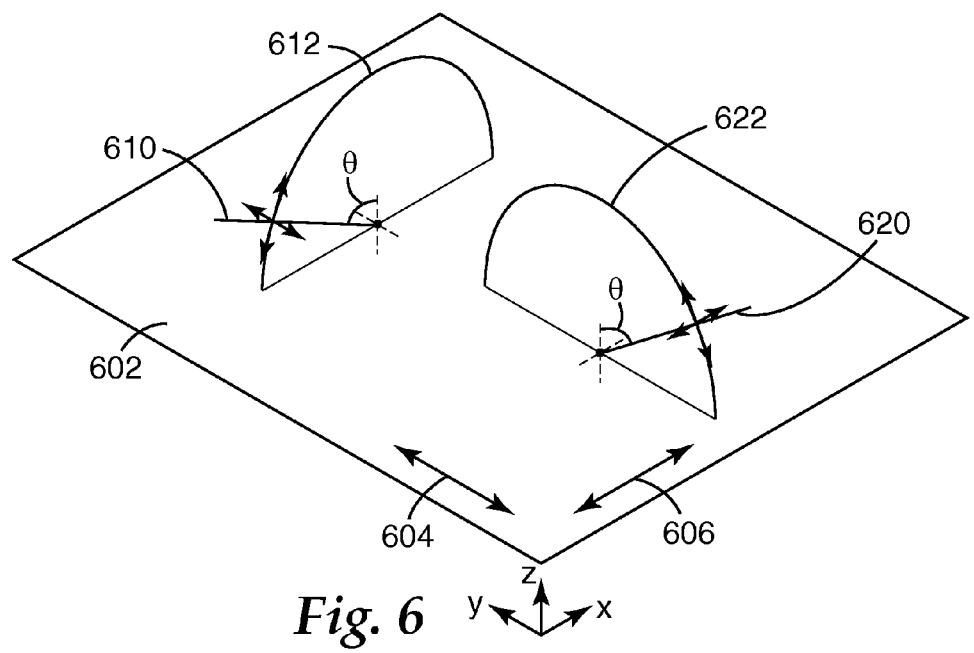
FIG. 6 is a schematic perspective view of a reflective polarizing film.

For example, FIG. 6 illustrates light ray 610 that is incident on a standard polarizer 602 at an angle of incidence θ, thereby forming a plane of incidence 612. The polarizer 602 includes a pass axis 604 that is parallel to the y-axis, and a block axis 606 that is parallel to the x-axis. The plane of incidence 612 of ray 610 is parallel to the block axis 606. Ray 610 has a p-polarized component that is in the plane of incidence 612, and an s-polarized component that is orthogonal to the plane of incidence 612. The p-pol light of ray 610 has a vector component parallel to the block axis 606 of polarizer 602 and will, therefore, be substantially reflected by the polarizer, while the s-pol light of ray 610 is parallel to the pass axis 604 of polarizer 602 and will, at least in part, be transmitted.

Further, FIG. 6 illustrates ray 620 that is incident on polarizer 602 in a plane of incidence 622 that has a vector component parallel to the pass axis 604 of the polarizer 602. Therefore, the p-pol light of ray 620 is parallel to the pass axis 604 of the polarizer 602, while the s-pol light of ray 620 is parallel to the block axis 606 of polarizer 602. As a result, assuming that the polarizer 602 is an "ideal" polarizer that has a reflectance of 100% at all angles of incident light for light polarized in the block axis and 0% at all angles of incident light for light polarized in the pass axis, the polarizer transmits s-pol light of ray 610 and the p-pol light of ray 620, while reflecting the p-pol light of ray 610 and the s-pol light of ray 620. In other words, the polarizer 602 will transmit a combination of p- and s-pol light. The amount of transmission and reflection of p- and s-pol light will depend on the characteristics of the polarizer as is further described herein.

We explain more fully below how the refractive index relationships between adjacent microlayers in the multilayer optical film can be tailored to produce an optical film suitable for use as an optically immersed reflective polarizer, the film also advantageously exhibiting significant increases in reflectivity for obliquely incident light of the "pass" polarization state. The significant reflectivity increases for obliquely incident light may be designed to occur in only one plane of incidence or in two orthogonal planes of incidence, and in either case can be used in recycling systems to help confine or "collimate" light into a narrower viewing cone (as a result of the high reflectivity and low transmission off-axis, in at least one plane of incidence, and in some embodiments in two orthogonal planes of incidence) to provide increased brightness and/or contrast in a display system, or in order to collimate light from a luminaire. The reader should understand that the term "collimate" when used in connection with the disclosed reflective polarizing films is used broadly with the understanding that the films are, in exemplary embodiments, combined with other reflective or diffusive films or elements that at least partially recycle some light that is reflected by the polarizing film. Thus, when the polarizing film has a high transmission for normally incident light and a much lower transmission (higher reflectivity) for highly oblique light, at least some of the oblique light that is reflected may be reflected again by another optical element in the system back towards the polarizing film in a direction that is less oblique, such that it is now more likely to be transmitted by the polarizing film. In this sense, the initially highly oblique light is "converted" to less oblique light by the time it is transmitted by the polarizing film, and the polarizing film can be said to "collimate" the light impinging on it.

Figure 7A:
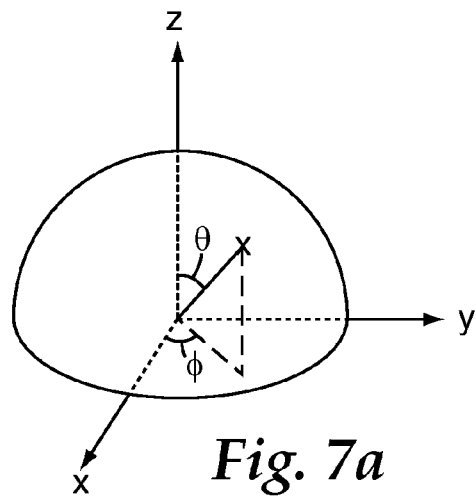
FIG. 7a is a perspective view of a direction hemisphere, wherein any point on the hemisphere represents a direction of light propagation in a film, characterized by a polar angle $\theta$ and an azimuthal angle $\phi$.
Figure 7B:
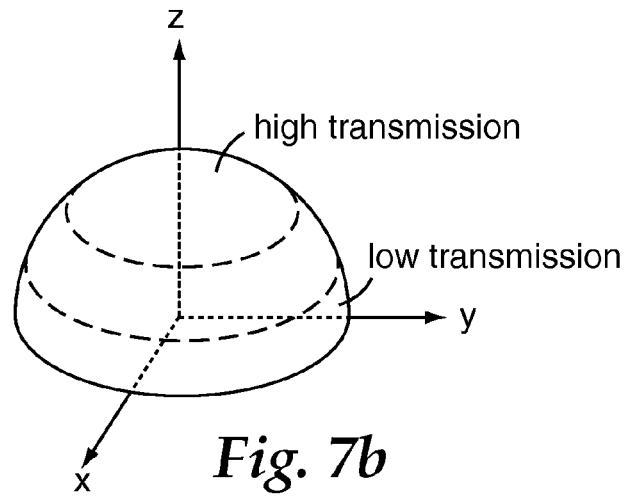
FIG. 7b is a perspective view of the direction hemisphere of FIG. 7a, showing in simplified fashion transmission properties of a 2-axis collimating multilayer reflective polarizing film as disclosed herein, for light having the pass state polarization.
Figure 7C:
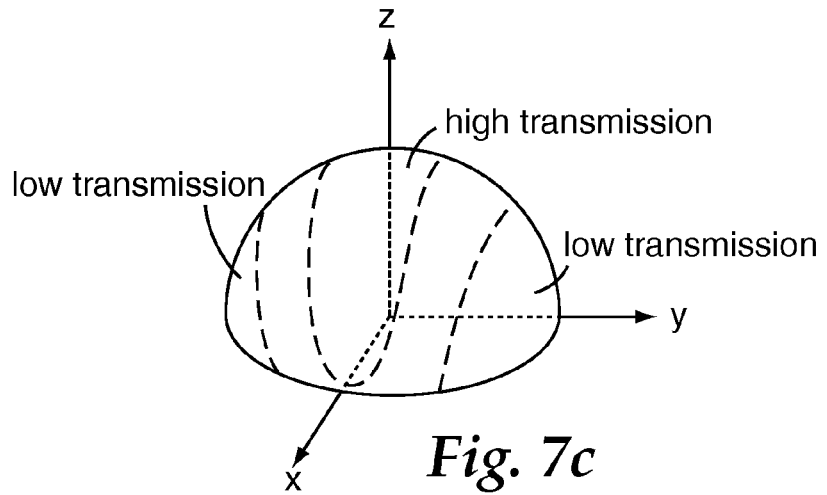
FIG. 7c is a perspective view similar to that of FIG. 7b, but showing in simplified fashion transmission properties of a 1-axis collimating multilayer reflective polarizing film, for light having the pass state polarization.

FIGS. 7a-c are provided to illustrate some desirable transmission and reflection properties of an immersed multilayer reflective polarizer as used in the disclosed laminates.

In FIG. 7a, a perspective view of a direction hemisphere is shown. Any point on the hemisphere represents a direction of light propagation, characterized by a polar angle θ and an azimuthal angle φ. The z-axis is perpendicular to the plane of the film. For purposes of FIGS. 7a-c, the angles θ, φ are assumed to be measured in the optically thick ultra-low index (ULI) material (and thus sometimes referred to as $\theta_{low\ index}$ and $\phi_{low\ index}$), regardless of where that ULI material layer may be situated relative to the multilayer optical film whose reflection and transmission properties we are concerned with. For example, the ULI layer may be adjacent to the multilayer optical film and disposed between the multilayer optical film and the light source. Alternately, the ULI layer may be adjacent to the multilayer optical film but disposed on the opposite side thereof. Alternately, the ULI layer may be separated from the multilayer optical film in the laminate construction by one or more other films or components, but with no significant air gaps therebetween.

The disclosed multilayer optical films preferably exhibit significant polarizing properties at least for light at low angles of incidence (i.e., normal or near-normal incidence, θ≈0). Thus, for normally incident light, the films preferably define a pass axis (e.g. along an in-plane y-axis) of low reflectivity and high transmission over visible wavelengths, and a block axis (e.g. along an in-plane x-axis) of very high reflectivity and very low transmission over visible wavelengths. Preferably, light of the "block" polarization is "blocked", i.e., characterized by very high reflectivity and very low transmission, over substantially all combinations of θ and φ, i.e., over all directions represented by the hemisphere. Thus, with reference to the geometry of FIG. 6, where 606 is the block axis, the disclosed reflective polarizing films preferably maintain high reflectivity for s-polarized light incident in plane 622, and for p-polarized light incident in plane 612, for angles θ up to about 90 degrees measured in the ULI material and for substantially all visible wavelengths.

The disclosed polarizing films preferably exhibit a more complicated and interesting behavior for light of the "pass" polarization, as depicted in an idealized, qualitative fashion in FIGS. 7b and 7c, which reproduce the direction hemisphere of FIG. 7a and superimpose thereon transmissive and reflective characteristics of different disclosed films for the "pass" polarization. In each case, the film provides relatively high transmission of light for normal and near-normal incidence. This transmission is said to be "high" in relation to the transmission of the block state light at normal/near-normal incidence, and is usually at least 50% and in some cases much greater than that, even approaching 100%, but in some cases it can also be substantially less than 50% and still be much higher than the transmission of the block state. A film having the latter characteristics may be useful, for example, in a very highly efficient recycling system having minimal losses.

Besides having a "high" transmission for normally incident light of the pass state, the films desirably have a much lower transmission (and higher reflectivity) for light of the pass state that is incident at highly oblique angles θ, at least for some ranges of the azimuthal angle φ. The increasing reflectivity with increasing angle effectively compresses the cone of viewing or of propagation of light traversing the film. The transition from "high" to "low" transmission is usually gradual, and thus regions of intermediate reflectivity are shown to separate high and low transmission regions. The "low" transmission at oblique angles is said to be "low" in relation to the transmission of pass state light at normal incidence. By providing reduced transmission, and increased reflectivity, for pass state light traveling at extreme angles of incidence (e.g. supercritical angles of incidence), problems associated with light propagating through the film at angles greater than those for which it was designed, e.g. those associated with the gap depicted in FIG. 4, can be avoided. Particularly in display and lighting applications, the increased reflectivity is preferably maintained relatively uniformly over substantially the entire visible spectrum, to avoid introducing significant color into the system. This in turn introduces certain requirements on the position of the right band edge of the reflection band of the film, due to the characteristic wavelength shift of a multilayer film reflection band with incidence angle.

As will be discussed further below, the multilayer polarizing film can be tailored such that the high and low transmission regions for the pass polarization state light are relatively insensitive to the azimuthal angle $\phi$, as shown in FIG. 7b, or they can be strongly dependent on $\phi$ as shown in FIG. 7c. For reasons that will be apparent, the azimuth-insensitive characteristics of FIG. 7b can be said to characterize a "2-axis collimating" multilayer reflective polarizing film, whereas the strongly varying azimuthal characteristics of FIG. 7c can be said to characterize a "1-axis collimating" multilayer reflective polarizing film. The distinction between these categories may depend on the application in which the film is intended, and how much of a difference between different azimuthal directions is considered significant in the given application. For convenience in the discussion that follows, we can simply characterize 2-axis collimating polarizing films as exhibiting a similar drop in transmission as a function of polar angle $\theta$ for two orthogonal planes of incidence, such as the x-z plane and the y-z plane, while characterizing 1-axis collimating polarizing films as exhibiting a substantial drop in transmission for one plane of incidence and little or no drop in transmission in the orthogonal plane of incidence. Note that in the case of a 1-axis collimating polarizing film, the plane of incidence exhibiting the substantial drop in transmission may be aligned with either the pass axis or the block axis of the film. When the plane of decreased transmission is aligned with the pass axis, the film can be referred to as an p-pol collimating film, because the p-polarization component of pass state light is increasingly reflected with increasing incidence angle, and when the plane is aligned with the block axis the film can be referred to as a s-pol collimating film, because the s-polarization component of pass state light is increasingly reflected with increasing incidence angle.

Depending on system features and requirements, and design constraints, some systems may benefit more by utilizing a 2-axis collimating polarizing film than a 1-axis collimating film, while for other systems the opposite may be true. Further discussion of such design considerations is provided elsewhere herein. Although the present application provides teachings that are pertinent to 1-axis as well as 2-axis collimating polarizing films, further information and examples directed to 1-axis collimating films can be found in U.S. patent application Ser. No. 61/254,692, "Immersed Reflective Polarizer With Angular Confinement in Selected Planes of Incidence", filed on even date herewith and incorporated herein by reference.

Besides providing enough off-axis reflectivity to ensure that light propagating at supercritical angles corresponding to the "gap" of FIG. 4 do not unduly degrade system performance, a secondary design challenge is the need to reflect and recycle a significant portion of light rays at even lower angles, e.g., from about 45 to 90 degrees in air. In some LCD televisions this angle range is redirected towards the normal with microlens array films. At least some of the reflective polarizers disclosed herein can provide for a substantial reflectivity of this moderate-to-high angle oblique light, in at least one plane of incidence, and can approximate the performance of one to two microlens films.

We have found that the above-described transmission and reflection characteristics can be achieved in practical multilayer films of reasonable design, e.g., having a reasonable number of microlayers and having refractive index relationships that are achievable using existing polymer materials and processing techniques. Some disclosed embodiments, for example, confirm that multilayer reflective polarizers with about 500 layers can be constructed that can reflect up to about 90% of the light in the gap indicated in FIG. 4 while still providing for high transmission values at normal incidence.

The optical properties of a multilayer optical film involve a finite number of parameters that may be considered "primary", such as the number of microlayers in the film and their distribution into one or more coherent packets within the film, the thicknesses of the various microlayers and the layer thickness profile, and the refractive indices of the layers, for example. In the present application we not only provide examples of how these primary parameters can be selected to produce a multilayer reflective polarizing film suitable for use as an immersed film in a laminate construction, we also identify certain secondary film parameters, and relationships involving such parameters, that may be important in assessing the suitability of a multilayer film in such constructions. These secondary film parameters may include one or more of the following:

The internal reflectivity of the film is defined for any of the four polarization cases at a given incidence angle $\theta$, i.e., the reflectivity for p-polarized light incident in the pass plane ("RPpass($\theta$)"); the reflectivity for s-polarized light incident in the pass plane ("RSblock($\theta$)"); the reflectivity for p-polarized light incident in the block plane ("RPblock($\theta$)"); and the reflectivity for s-polarized light incident in the block plane ("RSpass($\theta$)"), where the pass plane is a plane containing the pass axis and the normal axis of the film, the block plane is a plane containing the block axis and the normal axis of the film, and the angle $\theta$ may be the angle measured in air ($\theta_{air}$) or in the ultra-low index material ($\theta_{low\ index}$).

The internal transmission of the film is defined for any of the four polarization cases at a given incidence angle $\theta$, i.e., the transmission for p-polarized light incident in the pass plane ("TPpass($\theta$)"); the transmission for s-polarized light incident in the pass plane ("TSblock($\theta$)"); the transmission for p-polarized light incident in the block plane ("TPblock($\theta$)"); and the transmission for s-polarized light incident in the block plane ("TSpass($\theta$)").

We define the average of certain ones of the foregoing parameters. For example

Rpass($\theta$) is the average of RPpass($\theta$) and RSpass($\theta$); and
Tpass($\theta$) is the average of TPpass($\theta$) and TSpass($\theta$).

We define any of the foregoing parameters under specific conditions. For example:

% T00 is the internal transmission of the film at normal incidence for light of the pass polarization, which also equals Tpass(0), TSpass(0), and TPpass(0);

% T block is the internal transmission of the film at normal incidence for light of the block polarization, which also equals Tblock(0), TSblock(0), and TPblock(0);

% TA60S is the internal transmission of the film at an incidence angle of 60 degrees measured in air, for s-polarized light incident in the block plane, which also equals TSpass($\theta_{air}$=60);

% TA60P is the internal transmission of the film at an incidence angle of 60 degrees measured in air, for p-polarized light incident in the pass plane, which also equals TPpass($\theta_{air}$=60);

% TA60 is the average of % TA60S and % TA60P;

% TA90S is the internal transmission of the film at an incidence angle of 90 degrees measured in air, for s-polarized light incident in the block plane, which also equals TSpass($\theta_{air}$=90);

% TA90P is the internal transmission of the film at an incidence angle of 90 degrees measured in air, for p-polarized light incident in the pass plane, which also equals TPpass($\theta_{air}$=90);

% TA90 is the average of % TA90S and % TA90P;

% TU90S is the internal transmission of the film at an incidence angle of 90 degrees measured in the ultra-low index material, for s-polarized light incident in the block plane, which also equals TSpass($\theta_{low\ index}$=90);

% TU90P is the internal transmission of the film at an incidence angle of 90 degrees measured in the ultra-low index material, for p-polarized light incident in the pass plane, which also equals TPpass($\theta_{low\ index}$=90); and % TU90 is the average of % TU90S and % TU90P.

The position of the long wavelength band edge of the reflection band is sometimes also referred to as the red band edge (RBE) or right band edge, of the reflection band at the specified angle of incidence. In the case of a polarizer that has significant reflectivity of the pass polarization at normal incidence, the reflection band at normal incidence for pass-polarized light differs from the reflection band at normal incidence for block state light. In such cases, unless otherwise noted, the RBE refers to the long wavelength boundary of the reflection band, e.g., the wavelength at which the internal reflectivity drops to 90% of its average value within the band, for block-polarized light.

As mentioned above, a reflective polarizer can be made that is also substantially reflective for the pass axis at oblique angles. The pass axis reflectivity at the high angles can be tailored such that it is large for either s-polarized light, p-polarized light, or for both. These two components are incident from orthogonal directions, but both have the electric field vector parallel to a plane containing the pass axis of the film. If a high reflectivity is desired for the p-polarized pass axis light, but not for the s-polarized pass axis light, then a film with a large z-index differential and small y index differential can be used. If a high reflectivity is desired for the s-polarized pass axis light, but not for the p-polarized pass axis light, then a film with a large y-index differential and small z index differential can be used. Note that in order to provide a high reflectivity for light of the block polarization state, the x-index differential should be substantially greater than the y-index differential.

Referring back to FIG. 5, consider the case where the film has been stretched or oriented such that the first material (microlayer 502) is birefringent and the second material (microlayer 504) is isotropic having refractive index $n_2$, and further that $\Delta n_x > \Delta n_y > 0 > \Delta n_z$, i.e., $\Delta n_z$ is negative. In this case the first material exhibits both the highest ($n_{1x}$) and the lowest ($n_{1z}$) refractive index in the stack, but we shall nevertheless occasionally refer to the first material for convenience as the high index material and the second material as the low index material (not to be confused with the ultra-low index material). In order to exhibit high off-axis reflectivity for pass axis s-pol light, the low index layer should have an index $n_2$ that is substantially lower than $n_{1y}$ of the high index material. In order to provide high reflectivity for p-pol light, the same low index material should have an index $n_2$ that is substantially higher than $n_{1z}$ of the high index material. Maximizing one of these values by changing $n_2$ will minimize the other, so it is clear that in order for both s-pol and p-pol light to be maximally and nearly equally reflected at oblique angles, the y-z index differential of the birefringent layer ($n_{1y}-n_{1z}$) should be maximized. There is a further constraint that $n_{1x}$ be substantially larger than $n_{1y}$ in order that the block axis reflects much more light than the pass axis.

Films that are very reflective for both p-polarized and s-polarized light for the pass axis require large $\Delta y$ and $\Delta z$ index differentials. Most multilayer birefringent reflective polarizers are oriented only by a tenter, i.e. oriented only in the x direction. However, this produces a limited range of values for the y index of refraction. The y-index of refraction can be increased by also orienting the film in the y direction. This can be done in a simultaneous biaxial stretching procedure, or with a sequential stretch. Examples of both are given below.

Figure 9:
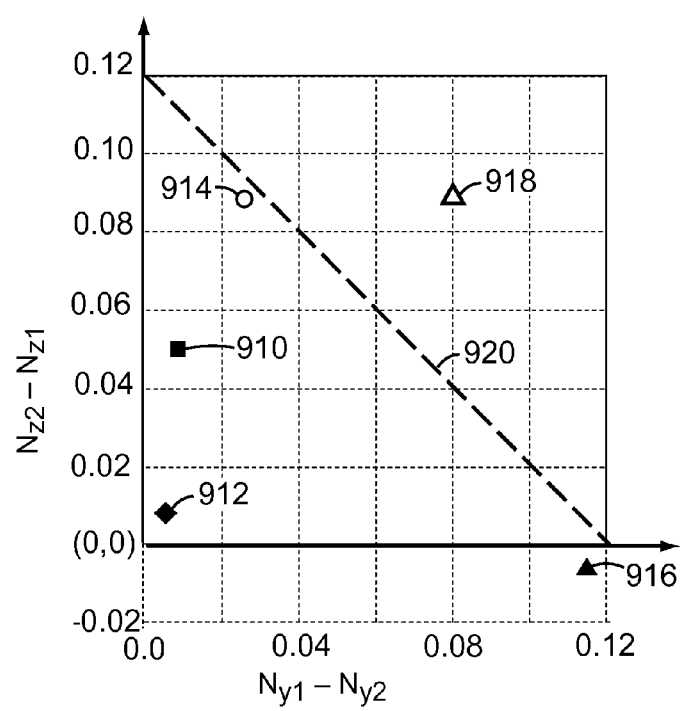
FIG. 9 is a graph of layer-to-layer refractive index differences along two orthogonal directions for certain multilayer optical films.

Before providing further explanation, in connection with FIG. 9, about asymmetric film processing considerations and how they affect the microlayer refractive indices, we describe a specific multilayer polarizing film example capable of providing 2-axis collimation.

Optical Film 1.1: 2-Axis Collimating Film, 550 Microlayers (Modeled)

Oblique angle reflectivity can be enhanced by using a high birefringence, a large number of microlayers, or both. This is an example that uses both approaches. Using the refractive indices listed in the table below, which are representative of suitably uniaxially oriented 90/10 coPEN for material 1 and coPET for material 2, and further assuming skin layers of the coPET material (isotropic index of 1.555) on both sides of a single stack of 550 microlayers, the microlayers provided with a continuous layer thickness profile optimized for a flat spectrum and providing a left band edge (LBE) at normal incidence at 400 nm and a right band edge (RBE) at normal incidence at 1150 nm, the angular reflectivity of a uniaxial oriented film can be greatly increased.

|  | nx | ny | nz |
| --- | --- | --- | --- |
| Material 1 | 1.830 | 1.620 | 1.505 |
| Material 2 | 1.555 | 1.555 | 1.555 |
| Difference | 0.275 | 0.065 | −0.05 |

Figure 8A:
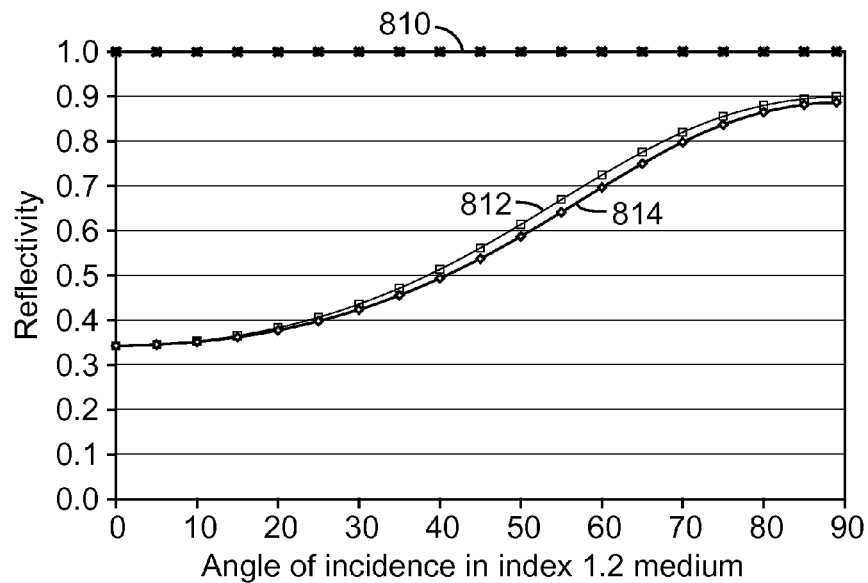
FIG. 8a is a graph of calculated internal reflectivity for a multilayer reflective polarizing film that is immersed in an ultra low index medium, as a function of incidence angle in the ultra low index medium.
Figure 8B:
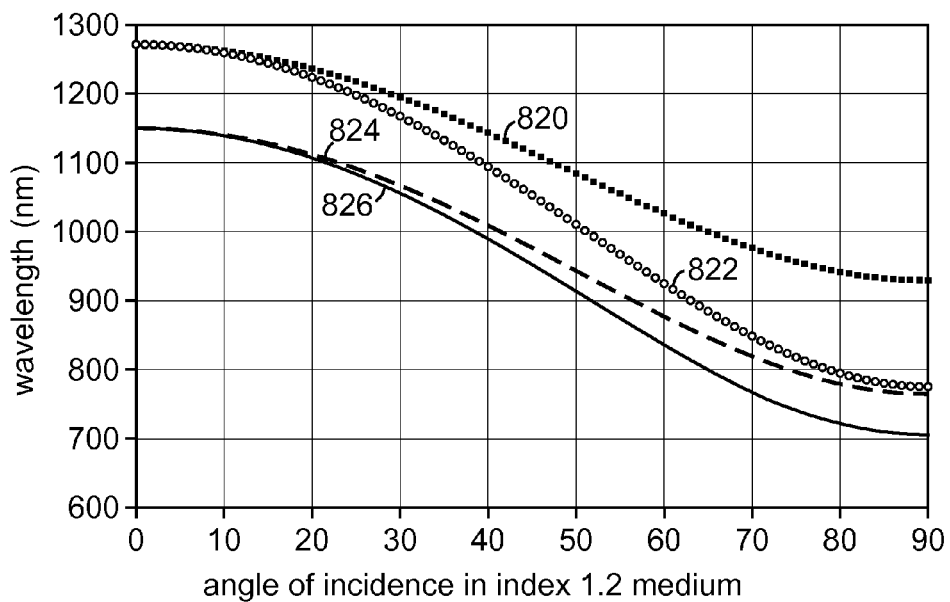
FIG. 8b is a graph of the calculated wavelength of the right band edge for the film of FIG. 8a, as a function of incidence angle in the ultra low index medium for both block state polarized light and pass state polarized light, and for both s- and p-polarization components in each case.

The calculated (internal) reflectivity vs. incidence angle curves are plotted in FIG. 8a, where incidence angle is assumed to be in a ULI medium of index 1.2. In the figure, curve 810 represents both RSblock($\theta$) and RPblock($\theta$), curve 812 represents RSpass($\theta$), and curve 814 represents RPpass($\theta$). Note that the pass state reflectivity for both s-polarized and p-polarized light increases to almost 0.9 at the highest angles. For most angles, these reflectivity values will dominate the surface and interfacial reflections in the system construction, even for s-polarized light. FIG. 8b plots the position of the right band edge (RBE) for both the pass polarization and the block polarization as a function of the incidence angle in the index 1.2 ULI material, where curve 820 depicts the RBE position for the block state and s-polarized light, curve 822 depicts the RBE position for the block state and p-polarized light, curve 824 depicts the RBE position for the pass state and s-polarized light, and curve 826 depicts the RBE position for the pass state and p-polarized light.

Choice of polymers and process also affect the cost and manufacturing yield of a film product. For this reason, it may be advantageous to use a different low index material, or to process the polarizer differently. For example, the extrusion equipment needed to make the 550 layer polarizer of Optical Film 1.1 may be somewhat expensive and difficult to design. It may be preferable to laminate or co-extrude two 275 layer films made with the alternative approach described below.

There are several refractive index parameters for the microlayers of a multilayer optical film that affect the reflectivity for any given angle of incidence and we summarize this information in FIG. 9. The reflectivity for s-polarized light increases with the value of $\Delta ny=n1y-n2y$ which increases to the right along the abscissa. The reflectivity of p-polarized light depends on $\Delta ny$ but also depends greatly on $-\Delta nz=n2z-n1z$ which increases along the vertical axis of FIG. 9. For constrained uniaxially oriented films, the maximum y-z birefringence of the high index layer determines the maximum values $\Delta ny$ and $\Delta nz$ that can be attained between alternating layers. For coPEN high index layers, this limit is about $\Delta n=0.12$ because the highest y-index for constrained uniaxially oriented PEN is about $n=1.62$, and the lowest z-index is about $n=1.50$. This birefringence is achievable by maximizing the PEN content and orienting the cast web at relatively low temperatures or high draw ratios, or both, as is known in the art of polyester film making.

The values of the refractive index differences $\Delta ny$ and $\Delta nz$ of some multilayer optical film reflective polarizer products available from 3M Company, namely, Vikuiti™ DBEF-q film and Vikuiti™ APF film, are marked on the plot in FIG. 9 with reference numerals 910, 912, respectively. The maximum values of reflectivity for obliquely incident s-polarized and p-polarized light, for uniaxially oriented multi-layers, occur for films that have index differential values along the diagonal dashed line 920 in this plot. Film 1.1, which has equal reflectivity for s-pol and p-pol light, falls on this line at the point ($\Delta ny=0.065$, $\Delta nz=0.05$). At the lower right corner of the graph, the collimating potential for s-polarized light is a maximum because $\Delta ny$ is large, but the collimating potential for p-polarized light is zero because $\Delta nz$ is zero and the reflectivity of for p-polarized light will not change with angle of incidence. At the upper left corner of the graph, the reflectivity is large for p-polarized light and zero for s-polarized light. Near the point ($\Delta ny$, $\Delta nz$)=(0.04, 0.8) the reflectivity is a maximum for p-polarized light. When using coPEN films having maximum birefringence in a polarizer construction, changes in the index value of the low index layer moves one along the design space of the dashed line 920. All index sets to the left of and below the dashed line 920 have lower reflectivity for light at a given angle of incidence. All index sets above and to the right of the dashed line will provide for greater reflectivity at the same angle of incidence. Point 916 represents Optical Film 3.4.

Increasing the index differentials $\Delta ny$ and $\Delta nz$, and therefore the reflectivity for oblique light, can be accomplished with the same material sets as discussed above by additionally orienting the films in the machine direction (MD) or y-direction. This process will naturally lower the index in the x-direction, so this places a limit on this approach. However, it allows one to operate in the space above and to the right of the dashed line 920 in FIG. 9. For example, the point 918 represents a reflective polarizing film that can be made by orienting the film in the MD direction and subsequent heat setting. Such film is referred to herein as Optical Film 1.2 and is described further below. Point 914 represents a film made according to the description of Optical Film 1.2, but without orienting the film in the MD or y-direction.

In general, the foregoing process is referred to as an asymmetrical biaxial orientation. With this process, the y-index of the coPEN can be increased. In the limit of ny increasing to about 1.75 with a z-index of 1.5, nx decreases to about 1.75, at which point the film becomes a symmetrical mirror. At some intermediate value of the index n1y, the film will still be an effective polarizer and the reflectivity for pass axis light will be large, even for low layer counts such as 275 layers. Two or more such films can then be laminated if desired as illustrated by the example below.

Optical Film 1.2: 2-Axis Collimating Film, 275 Microlayers (Modeled)

A multilayer material stack of alternating layers of 90/10 coPEN and PETg can be coextruded and oriented approximately 3:1 in the y-direction and 5:1 in the x-direction to obtain the refractive index characteristics shown in the table below for alternating microlayers, after a high temperature heat set.

|  | nx | ny | nz |
| --- | --- | --- | --- |
| Material 1 | 1.80 | 1.675 | 1.50 |
| Material 2 | 1.595 | 1.595 | 1.595 |
| Difference | 0.205 | 0.08 | −0.095 |

Figure 10:
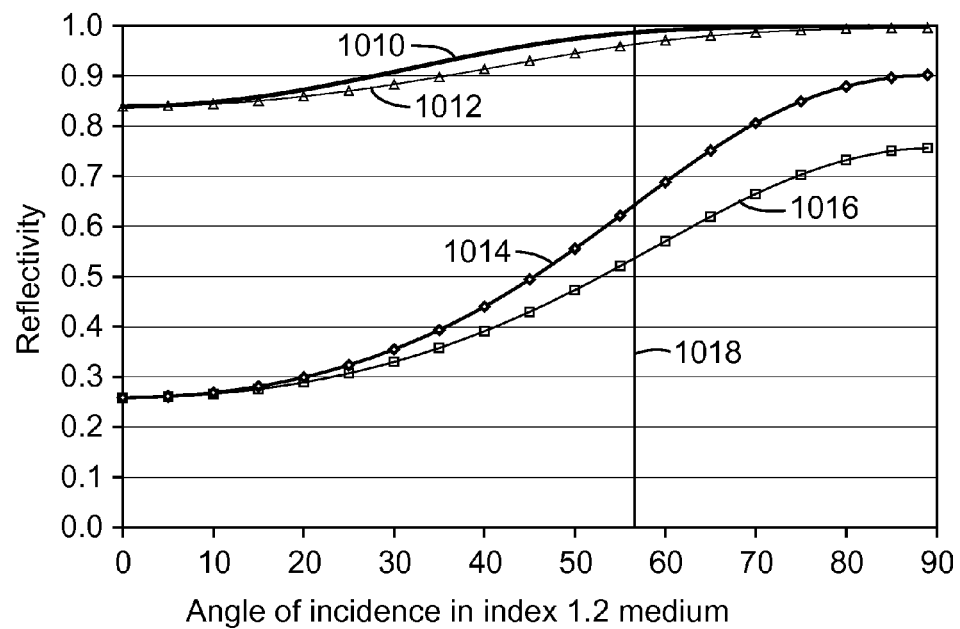
FIGS. 10 and 11 are graphs of calculated internal reflectivity for additional multilayer reflective polarizing films that are immersed in an ultra low index medium, as a function of incidence angle in such medium.

If the resulting asymmetrically oriented multilayer optical film is assumed to have a single packet of 275 microlayers, with skin layers of the isotropic PETg on both sides of the packet, the microlayers provided with a continuous layer thickness profile optimized for a flat spectrum and providing a left band edge (LBE) at normal incidence at 400 nm and a right band edge (RBE) at normal incidence at 1150 nm, a reflective polarizing film is produced whose calculated reflectivity characteristics are shown in FIG. 10. In that figure, curve 1010 represents RSblock(θ), curve 1012 represents RPblock(θ), curve 1014 represents RPpass(θ), and curve 1016 represents RSpass(θ). The line 1018 represents the incidence angle in the ULI index 1.2 medium that corresponds to an incidence angle in air of 90 degrees.

Optical Film 1.3: 2-Axis Collimating Film, 275 Microlayers×2 Packets

Figure 11:
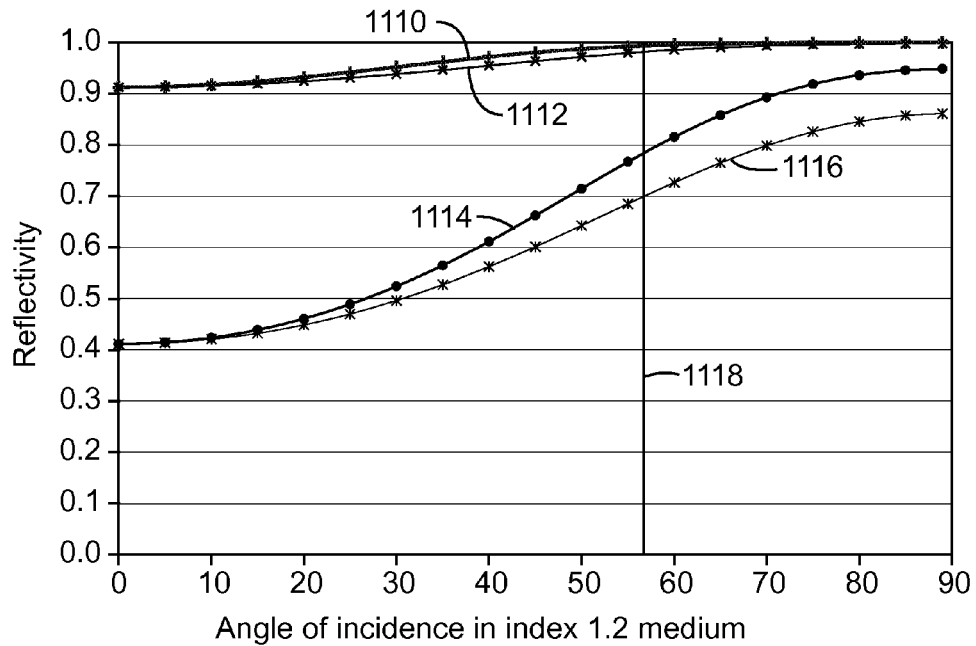

If two of the Optical Films 1.2 are laminated together, to produce an Optical Film 1.3 having a total of 550 layers (but arranged in two coherent packets that are separated from each other by an optically thick layer of the material used in the low index microlayers), the calculated reflectivities shown in FIG. 11 are produced. In that figure, curve 1110 represents RSblock(θ), curve 1112 represents RPblock(θ), curve 1114 represents RPpass(θ), and curve 1116 represents RSpass(θ). The line 1118 represents the incidence angle in the ULI index 1.2 medium that corresponds to an incidence angle in air of 90 degrees.

Having described several 2-axis collimating multilayer reflective polarizing films, and before describing additional 1- and 2-axis collimating reflective polarizing films, we now turn our attention to some of the laminate constructions in which the films can be used. Although some emphasis is placed on applications for optical displays, such as backlights and LC panels, the reader should understand that other applications for the disclosed films and laminates are also contemplated. In many cases, the laminate constructions include at least four elements: the disclosed 1- or 2-axis collimating multilayer reflective polarizing film, an optically thick layer of the ULI material, a layer or other mechanism for injecting supercritical light into the multilayer film, and a layer or mechanism for extracting some of the supercritical light out of the system. The latter can be any layer with surface structure or a thick layer with internal scattering and absorbing elements such as an LCD TV panel.

Figure 12:
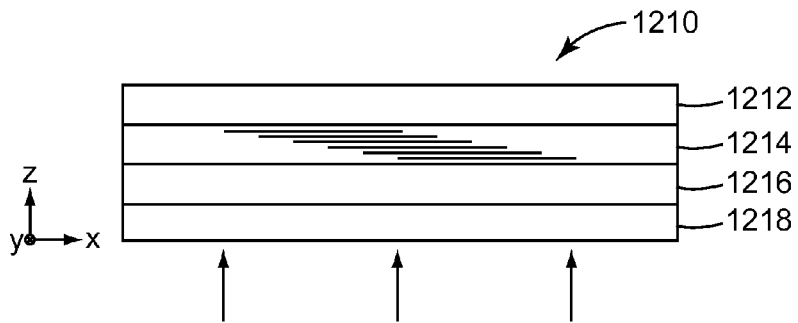
FIGS. 12 and 13 are schematic side views of laminate constructions that incorporate at least one optically thick ultra low index layer and a multilayer reflective polarizing film as disclosed herein.

FIG. 12 shows a schematic side view of a laminate construction 1210 that includes an LC panel 1212. The construction 1210 also includes any of the reflective polarizing multilayer optical films 1214 as disclosed herein, an optically thick film or layer 1216 of the ULI material, and a diffuser layer 1218. Light from a backlight, incident on the construction 1210 from below, travels through the various layers to illuminate the display for a viewer.

The recycled oblique pass-axis light of the immersed reflective polarizer 1214 increases the on-axis luminous gain of a lighting system while diminishing the oblique angle output of the system. The diffuser layer 1218 can be a heavy diffuser with substantial reflection such as a replacement for e.g. a 50% T, 60% T, or a 70% T diffuser plate, or it can be a microstructured surface such as a prismatic, beaded, or lenslet array. An additional diffuser layer can also be added between the reflective polarizer 1214 and the LCD glass panel 1212. Such additional diffuser may be desirable, e.g., if the reflective polarizer has some undesirable color. Alternatively, the additional diffuser may be in the form of a microstructure that aids in further collimating the light transmitted by the reflective polarizer. If the diffuser takes the form of a microstructured surface, then the ULI should be placed between the LCD panel 1212 and the microstructured surface. Alternatively for higher efficiency, a second ULI layer can be inserted at that interface while keeping the first ULI layer in the position shown in FIG. 12.

Figure 13:
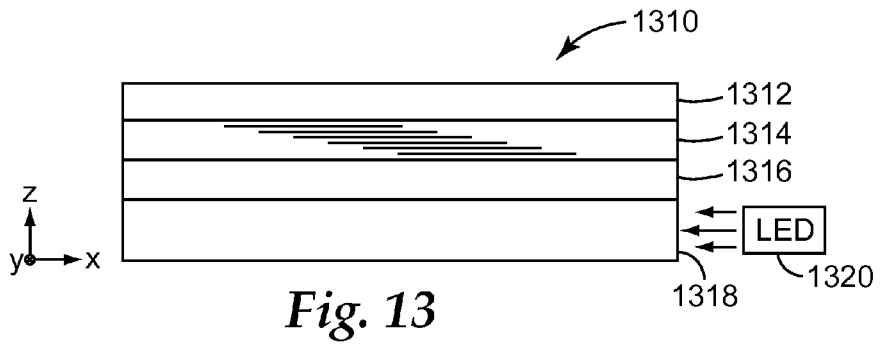
Figure 14:
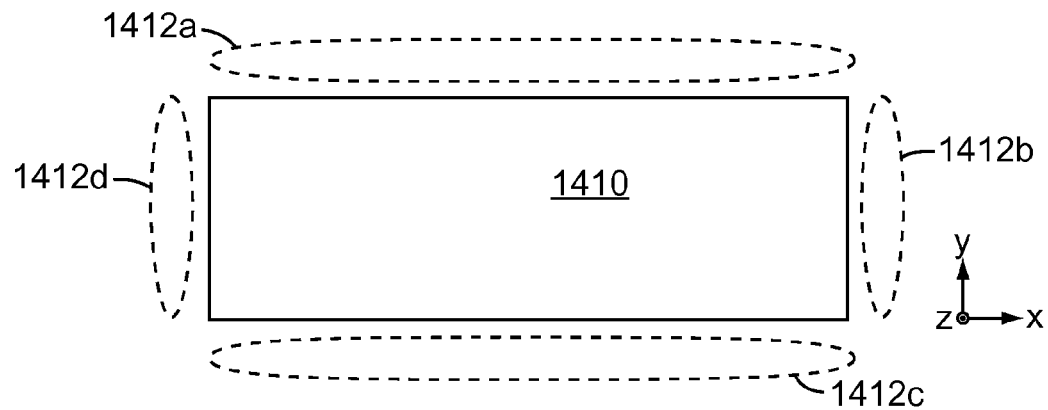
FIG. 14 is a schematic front or top view of the laminate construction of FIG. 13.

FIG. 13 is a schematic side view of another laminate construction 1310 that incorporates at least one optically thick ultra low index layer 1316 and a multilayer reflective polarizing film 1314 as disclosed herein, to form an edge-lit or direct-lit backlight or a portion thereof. Layer 1312 is a diffuser layer, which may be semi-specular to aid in hiding color that may be present in the reflective polarizer, or it may be or comprise a structured surface, e.g. linear prismatic surface, that diffuses light and also aids in collimating the light transmitted by the reflective polarizer. Layer 1318 may be or comprise a diffuser plate which is positioned above an array of LEDs or other suitable light sources (not shown) in a direct-lit backlight configuration. Alternatively, layer 1318 may be or comprise a solid light guide, in which case an LED 1320, or other suitable light source, may inject supercritical angle light into the system via one or more side or end surfaces. This is shown more clearly in the front or top view of FIG. 14, where element 1410 represents the laminate 1310 or layer 1318 thereof, and the regions 1412a-d illustrate the possible positions at which light sources may be placed for injecting light into the light guide. If the light source(s) are placed at one or both of regions 1412b, 1412d, problems associated with supercritical light propagation may be more acute along axes parallel to the x-axis (note the x-y-z axes in the figures for reference purposes) rather than the y-axis. Similarly, if light source(s) are placed at one or both of regions 1412a, 1412c, problems associated with supercritical light propagation may be more acute along axes parallel to the y-axis rather than the x-axis.

FIGS. 15-18 depict a variety of different laminate constructions that comprise a display panel and a disclosed reflective polarizing films.

Figure 15:
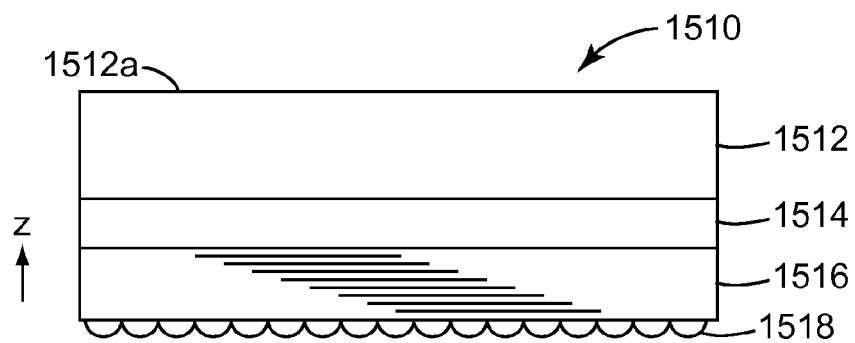
FIG. 15 is a schematic side view of a laminate construction that includes a display panel and a multilayer reflective polarizing film.

In FIG. 15, a laminate construction 1510 includes a display panel 1512 such as an LC display panel, an optically thick optical adhesive layer 1514, a multilayer reflective polarizing film 1516 as disclosed herein, and a diffusing layer 1518 such as a beaded gain diffuser or the like applied to the polarizer film 1516. In this embodiment, the adhesive layer 1514 may be composed of a conventional adhesive material, which may have a refractive index on the order of 1.5, rather than a ULI material. Thus, the construction 1510 may include no ULI layer therein, as well as no airgaps between the elements shown. Such non-ULI embodiments are discussed further below. The construction 1510 may be combined with a suitable backlight which may be positioned to illuminate the construction 1510 and panel 1512 from below.

Figure 16:
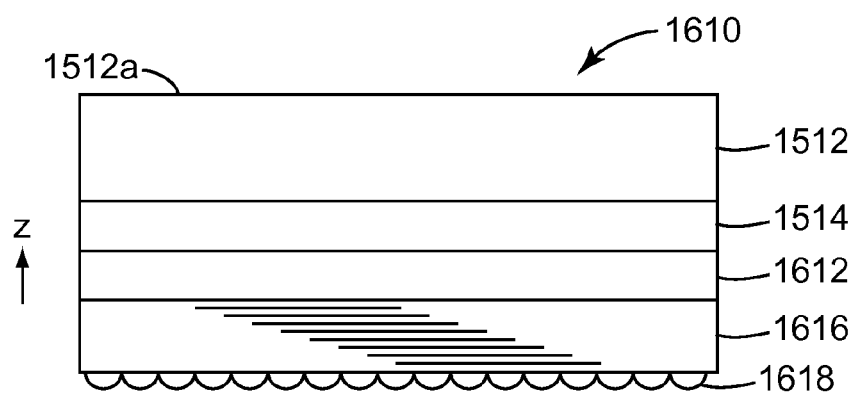
FIGS. 16-18 are schematic side views of laminate constructions that include a display panel, a multilayer reflective polarizing film, and an optically thick ultra low index layer.

In FIG. 16, a laminate construction 1610 is shown that is similar to construction 1510 of FIG. 15, where like elements are given like reference numbers. In the embodiment of FIG. 16, an optically thick ULI layer 1612 is provided between the multilayer reflective polarizing film 1616 and the conventional optical adhesive layer 1514. Depending on whether the ULI layer 1612 is placed in the laminate (e.g. it may be relocated to lie between the reflective polarizer 1616 and the diffusing layer 1618), it can serve to limit the propagation of highly oblique light in the reflective polarizer, or to redirect such highly oblique propagating light back towards the reflective polarizer, to a much greater extent than the conventional adhesive material of layer 1514. As a result, the bandwidth of the reflection band for reflective polarizing film 1616 may be made significantly less than that of polarizing film 1516 in FIG. 15.

Figure 17:
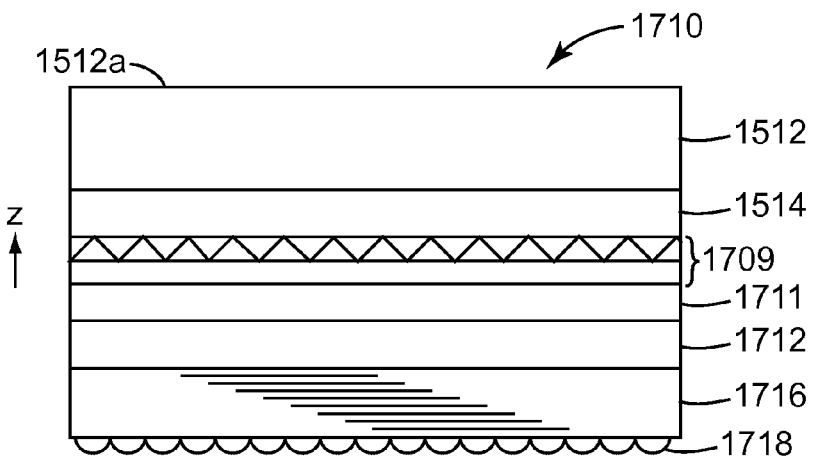

In FIG. 17, a laminate construction 1710 is provided with some additional diffusing or collimating elements. In this case, a layer 1709 is provided that comprises a prismatic structured surface film, such as a linear prismatic BEF film. In the layer 1709, the prisms are disposed on a film substrate, with the prism points in close proximity to or in contact with the adhesive layer 1514. The space between the prisms and the adhesive layer is filled by a ULI material. The ULI material of layer 1709 thus planarizes the prisms. Layer 1711 is another conventional optical adhesive layer. Layer 1712 is an optically thick ULI layer. Layer 1716 is a multilayer reflective polarizing film as disclosed herein. Layer 1718 is a diffusing layer, such as a beaded gain diffuser.

Figure 18:
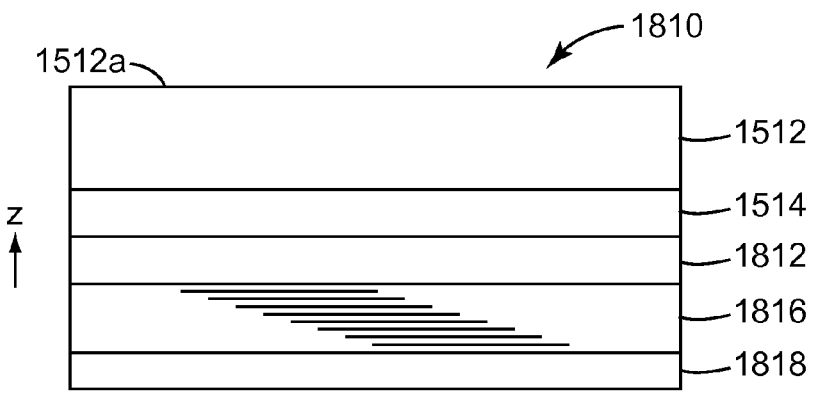

In FIG. 18, a laminate construction 1810 includes, besides the other elements already discussed, an optically thick ULI layer 1812, a multilayer reflective polarizing film 1816 as disclosed herein, and a volume diffuser layer 1818, arranged as shown.

Figure 19:
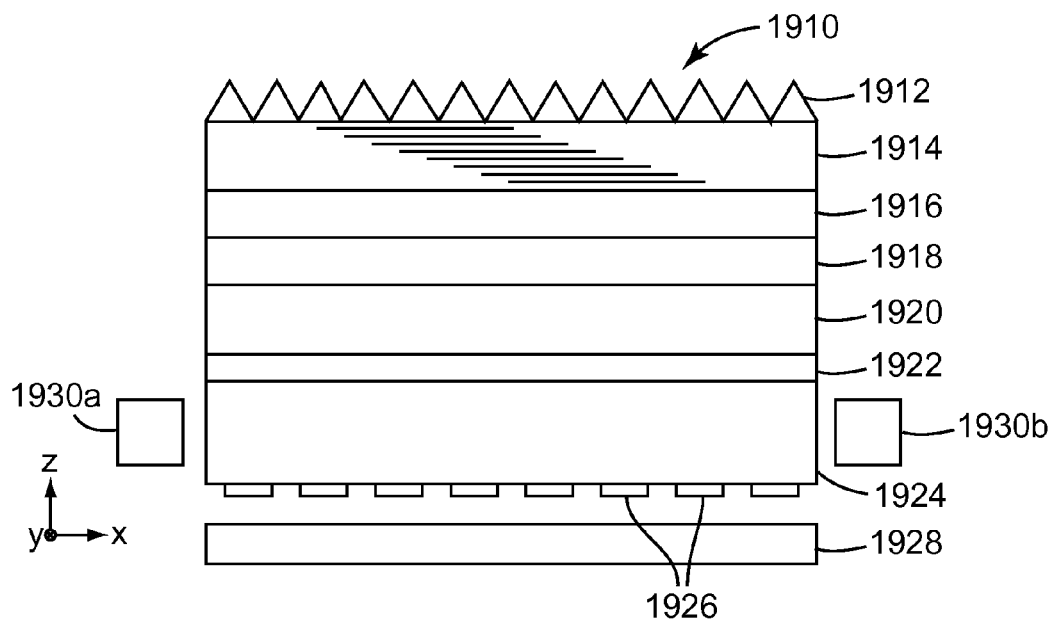
FIG. 19 is a schematic side view of a laminate construction that includes a light guide, a multilayer reflective polarizing film, and an optically thick ultra low index layer.

FIGS. 16-18 are schematic side views of laminate constructions that include a display panel, a multilayer reflective polarizing film, and an optically thick ultra low index layer;

Having described several different laminate-on-display panel constructions, we turn to FIG. 19 for an exemplary laminate-on-light guide construction 1910. In this embodiment, prism structures 1912, such as those used in BEF prismatic films, are applied to a multilayer reflective polarizing film 1914 as disclosed herein. In this case, the prisms are exposed to air and transmit light that has passed through the polarizing film 1914 generally upwards towards a display panel or viewer. Such light originates from light sources 1930a, 1930b, which are shown in an edge-lit configuration at an edge of a solid light guide 1924. The light guide 1924 is provided with a pattern of conventional extractors 1926. Light that escapes from the bottom of light guide 1924 is reflected by a white back reflector 1928. A pressure sensitive adhesive layer 1922 adheres the light guide 1924 to the other components above, including a graded index ULI layer 1920, a high haze ULI layer 1918 (which may also be a volume diffuser), and a low haze ULI layer 1916.

Further Discussion

As mentioned above, several parameters of the reflective polarizer performance may be significant with respect to utility in an LCD backlight, or any other polarized lighting system that requires a reduction in intensity at high angles and/or enhanced intensity on-axis. These parameters include % T block and % T00, discussed above. In the case of t-axis collimating immersed reflective polarizers, wherein the transmission values for s- and p-polarization components of the pass state may be similar to each other at oblique angles, the parameters may also include % TA60, % TA90, and % TU90, each of which is an average of s- and p-pol components.

These transmission values have a range of preferred values due to requirements of the systems in which they may be applied. In addition, there are trade-offs because changing one of these parameters for a film will change one or more of the other parameters. One reason for this is the limit of birefringence that is available from any material. Polymers such as PEN and PET exhibit a birefringence due to the orientation of the polymer crystallites and some of the molecular chains in a semi-crystalline polymer film. This process of generating crystalline and molecular order is generally referred to as the orientation of the film. The polymer films can be oriented in either the x or y direction, or both. An orientation of the film in any direction will affect the index of reflection in that direction, as well as in the other two directions. The z index of refraction will be minimized if the film is highly oriented in both the x and y directions. The x-index can be increased to a maximum value, but only at the expense of decreasing the y-index to a minimum value. These properties are known, but are restated here in order to discuss the tradeoffs related to optimizing the five parameters listed above. For example, processing the film in order to increase the y index of refraction of the high index layer will decrease % T00, but it will also decrease the x-index of refraction, thus increasing % T block. To a first order approximation, the sum of the x, y, and z indices is a constant. With maximum orientation in either the x or y direction, or both, the z index is minimized for polyester based systems, and likewise for other so-called "positively birefringent systems. Asymmetries in orientation such as a decrease in the x-direction accompanied with an increase in the orientation in the y direction may leave the z index approximately constant.

One may wish to minimize the value of % T block for an LCD backlight in order to reduce the loss of light having the block axis polarization via absorption in the absorbing polarizer of the LCD panel. However, since % T block requires a large value of nx for the high index layer, the y index should not be increased to such a large value that nx is decreased to the point that Tblock becomes too large. Generally, % T block is desirably less than an average of 15% or 20% over the visible spectrum at normal incidence. Values of % T block of less than 10%, or less than 5% are more desirable.

In exemplary embodiments, % T00 is made to be high enough so that substantial amounts of pass axis light are transmitted through to the end use, especially if the recycling system is not efficient at returning the rejected pass axis rays back to the film. If the system requirements include high reflectivity for s-polarized pass axis light, then a moderate internal reflectivity would be called for at normal incidence. S-polarized light is reflected only if there is a mismatch in the y indices of the alternating microlayers. This mismatch, as well as the number of layers, also determines the value of % T00. Any film that reflects substantial amounts of s-polarized light will also reflect substantial amounts of light at normal incidence. Therefore a film that is intended for a strong reflection of s-polarized light may require an internal reflection at normal incidence of at least 20% and more typically 30% or even 50% or 60%. The more efficient a backlight system is, the lower the acceptable value of % T00 may be. Thus, the internal transmission % T00 can range in value from 40% to as high as 80%.

The value of % TA60 will depend greatly on the value of % T00. As described above, % T00 may need to be substantially less than 100% in order to obtain substantial reflectivity for s-polarized light. If % T00 is reduced, then % TA60 will also be reduced if there are no Brewster angles in the films. A more useful parameter therefore is the ratio of % TA60% T00. In order to reduce the width of the viewing cone of a display or the angular output of a luminaire from that of a wide angle or Lambertian light source, the ratio % TA60% T00 should be reduced. For many displays and light sources, the brightness at 60 degrees is desirably much less than the axial or 0 degree brightness. Useful values of % TA60% T00 for the films described herein range from 0.85 to any lower value.

% TA90 and % TU90 are both desirably minimized in these constructions since this value is representative of how much high angle light is not blocked in the gap region of FIG. 4. The ratios of % TA90% T00 and % TU90% T00 are therefore also minimized. The light rays propagating from 56.4 to 90 degrees in a 1.2 index ULI are propagating at angles greater than those that can be injected from air. They are not blocked by TIR at a ULI interface and so they are desirably blocked by reflection from the reflective polarizer for both pass and block polarizations. Note that although neither % TA90 nor % TU90 can be measured in air, they can nevertheless be either estimated by extrapolation from lower angle measurements, or they can be measured directly through an optically coupled prism of known index.

The propagation angle in air of 60 degrees corresponds to 46.2 degrees in a medium of index 1.20, which was the medium for the modeled curves shown in FIGS. 8a, 10, and 11. The five parameters defined above can be obtained directly from the curves in these Figures. A propagation angle of 90 degrees in a ULI of index 1.2 is equivalent to an angle of 52 degrees in a material of index 1.52. A propagation angle of 90 degrees in air is equivalent to a propagation angle of 41.1 degrees in a material of index 1.52. Thus T90A and T90U can be measured by laminating the film between glass prisms, either of the 45 degrees type and rotating to the appropriate angle, or by using prisms with a special cut angle so that normal incidence can be used on the prism face.

Many film constructions are possible by changing the various indices of refraction, either by the orientation processes for the birefringent layers, or by changing the material composition of the polymeric layers. Also, the number of layers or the optical stack design can be changed. Results for a variety of embodiments, including Optical Films 1.1, 1.2, and 1.3 described above, and Optical Films 2.1, 2.2, and 2.3 described below, are listed in Tables A and B:

TABLE A

|  | Film 1.1 | Film 1.2 | Film 1.3 | Film 2.1 | Film 2.2 | Film 2.3 |
| --- | --- | --- | --- | --- | --- | --- |
| Layers/Pkt | 550 | 275 | 275 | 550 | 1000 | 275 |
| Packets | 1 | 1 | 2 | 1 | 1 | 1 |
| % T00 | 66 | 74 | 59 | 54 | 69 | 36 |
| % TA60S | 46 | 59 | 41 | 33 | 50 | 14 |
| % TA60P | 48 | 53 | 36 | 31 | 45 | 36 |
| % TA90S | 32 | 46 | 30 | 20 | 35 | 5 |
| % TA90P | 34 | 36 | 22 | 17 | 27 | 36 |
| % TU90S | 10 | 24 | 14 | 5 | 12 | 0 |
| % TU90P | 11 | 10 | 5 | 2 | 5 | 36 |
| % T block | 0 | 16 | 9 | 1 | 1 | 0 |

TABLE B

|  | Film 1.1 | Film 1.2 | Film 1.3 | Film 2.1 | Film 2.2 | Film 2.3 |
|---|---|---|---|---|---|---|
| % T00 | 66 | 74 | 59 | 54 | 69 | 35 |
| % TA60S/% T00 | 0.70 | 0.80 | 0.69 | 0.61 | 0.72 | 0.39 |
| % TA60P/% T00 | 0.73 | 0.72 | 0.61 | 0.57 | 0.65 | 1 |
| % TA90S/% T00 | 0.48 | 0.62 | 0.51 | 0.37 | 0.51 | 0.14 |
| % TA90P/&T00 | 0.52 | 0.49 | 0.37 | 0.31 | 0.39 | 1 |
| % TU90S/% T00 | 0.15 | 0.32 | 0.24 | 0.09 | 0.17 | 0.00 |
| % TU90P/% T00 | 0.17 | 0.14 | 0.08 | 0.04 | 0.07 | 1 |

The most efficient stack design for creating the highest reflectivity for a broadband reflector with the minimum number of layers is one with a continuous gradation in the quarterwave thickness value from one surface of the stack to the other surface. The Optical Film 1.1 is designed in this manner with 550 continuously graded layers. However, the choice of optical design for a successful product is often restricted by manufacturing costs such as materials and equipment cost. The Optical Film 1.3, whose reflectivity is shown in FIG. 11, is designed to be made by laminating or co-extruding two separately made graded stacks of 275 layers each. The two separate reflectors do not coherently reflect light with respect to one another, and on the average give an increase in reflectivity using the "pile of plates" formula for the incoherent combination of two reflectors:

$$R=\{R1+R2*(1-2*R1)\}/(1-R1*R2).$$

Such a combination of films is more effective at increasing the reflectivity for % T00 than for % TA90 or % TU90 or % T block, as can be observed by comparing FIGS. 10 and 11.

Further Embodiments

Optical Film 2.1: 2-Axis Collimating Film, 550 Microlayers (II)

Optical Film 1.1 can be modified by changing the orientation from a tentered only film to an asymmetrical biaxially oriented film and by small changes in the material layers. This can be done in a manner that changes the indices of the high index layer from (1.83, 1.62, 1.505) to about (1.80, 1.66, 1.505). Minor changes in the composition of the high index layer may be made to facilitate this process. The low index layer can be changed from 1.555 to 1.58. Note from Tables A and B above that this decreases % T00 somewhat, but it dramatically reduces all of the % T90 values and the ratios % TA60% T00 and % T90% T00.

Optical Film 2.2: 2-Axis Collimating Film, 1000 Microlayers

The high index layer of Optical Film 1.1 can be changed from a coPEN to PET, which may have a great materials cost advantage. However, the equipment and processing cost may be impacted because 1000 continuously graded layers are now required. Indices of nx=1.71, ny=1.59 and nz=1.50 are easily obtained with PET films that are oriented in a constrained uniaxial fashion (standard film tenter), with a low index material with n=1.55. The optical performance is similar to a PEN based film, as noted by the values listed in Tables A and B above.

Optical Film 2.3: 1-Axis Collimating Film, 275 Microlayers×1 Packets

A strong s-pol reflecting film can be made with only 275 layers. Using a high index layer with indices of nx=1.82, ny=1.62, and nz=1.505 and a low index layer with an index of 1.505, 275 layers and a constrained uniaxial stretch, the performance values listed in Tables A and B can be obtained. Note that all ratios for T60P/T00 are about equal to 1.0, i.e., the reflectivity for p-polarized light does not increase with angle. The ratios for T60S/T00 are the lowest of any example in Table B. This modeled example is similar to Optical Film 3.4.

Optical Film 3.1: 2-Axis Collimating Film, 275 Microlayers×2 Packets (III)

In the process of making Optical Film 3.1, a cast web of a multilayer construction of alternating low and high index polymers was extruded onto a chilled casting wheel for later biaxial orientation on an offline batch film stretching apparatus. The extrusion process conditions necessary to provide the correct layer thickness values of this cast web were explored by the following method to insure that the optical film would have the desired optical properties after orientation on the off line equipment.

Using a feedblock method (see e.g. U.S. Pat. No. 6,783,349 (Neavin et al.)), the cast web for making a reflective polarizer of alternating low and high index polymer layers was made by co-extruding two similar packets of 275 layers of alternating low and high index polymer materials and subsequently joining the two packets of layers. For each 275 layer packet the high index layers were made with a 90/10 coPEN (a copolyester containing 90% ethylene naphthalate repeat units and 10% ethylene teraphthalate repeat units). The low index layers were made by blending in the extruder a mixture of 55% by weight of PETg GN071 (available from Eastman Chemicals) with 45% by weight of the 90/10 coPEN. 15% of the low index material was diverted from the melt train to form the protective boundary layers during the coextrusion process (7.5% to each side of the 275 layer extrudate). Skin layers of 100% PETG GN071 were applied to the melt flow, immediately preceding the extrusion die, at a rate of 24% of the total melt flow, 12% to each side of the film.

This preliminary cast web was then oriented in a standard film making tenter. The cast web was preheated in the tenter for 18 sec at about 157° C. The film was then stretched along the x-axis at 154° C. at an initial rate of about 60%/second for 4.5 seconds followed by a rate of about 15%/sec for 18 seconds. The total overall stretch ratio in the x direction was about 5.5:1. The film was then heat set for 18 seconds at 227° C. while towing in about 1% of the width.

The relative extrusion rates of the low and high index materials in each packet of layers were adjusted so that adjacent material layers in the finished film would each have approximately the same optical thickness. The listed materials, casting speed, and orientation conditions were intended to yield a set of indices of about n1x=1.82, n1y=1.62, n1z=1.505 and n2=1.595 and with both the low and high index layers having a quarterwave optical thickness for the block axis that is tuned to reflect from about 425 nm for the thinnest layers and increasing in thickness monotonically in a power law profile to reflect about 1150 nm light for the thickest layers of each packet. The extrusion casting wheel speed was adjusted so that the resultant reflection band spanned this wavelength range. The shape of the power law profile was chosen so that the resultant spectra were relatively flat across most of the spectrum for each packet. The spectral shape was fine tuned using the axial rod technique outlined in U.S. Pat. No. 6,783,349 (Neavin et al.). In the final oriented film, the skin layers were each about 11 microns thick. The total finished film thickness was about 90 microns thick.

The biaxially oriented films should reflect over about the same spectral range as the film just described. However, if it is to be oriented by a factor of 2:1 or 3:1 in the y direction while using the stretch in the x-direction that is described above, then the cast web needs to be made thicker by the same amount of 2:1 or 3:1. For this example the casting wheel was then slowed by a factor of 2.5:1 to thicken the cast web by that ratio compared to the above mentioned preliminary cast web.

The 2.5 times thicker cast web was cut into rectangular pieces measuring 127 mm×254 mm on adjacent sides. These pieces were then stretched on a Karo IV film stretcher, purchased from Brueckner of Siegsdorf, Germany. The cast web was first preheated for 90 seconds at 135° C. and then simultaneously stretched along both the short and the long axes, using a rate of 50%/sec on the short axis. The stretching process starts and stops on both axes simultaneously so the long axis stretch is done at a rate that is 2.5/5.5 times slower than the short axis. The film was then heat set for 30 seconds at 230° C. The programmed stretch ratios were 5.5×2.5 in the 12.7 and 25.4 mm directions respectively to give a finished film sample that was approximately square in shape and 620 mm×600 mm in dimensions. The machine has only 5 clips for each side of the sample and substantial neck-in of the film occurred at each clip on the long edge of each piece and some neck-in along the short side. This resulted in actual stretch ratios of 4.8×2.7. The actual stretch ratios were measured by marking a grid on the cast web with a permanent marker and then measuring the expansion of that grid. Part sizes of 325 mm×425 mm were obtained for later measurements on LCD TV panels. The film thickness was uniform to about +/−10% across this sample area. The areas showing the most extreme caliper variations were cut away and smaller parts with about +/−5% caliper variations were used for later measurements.

Figure 20A:
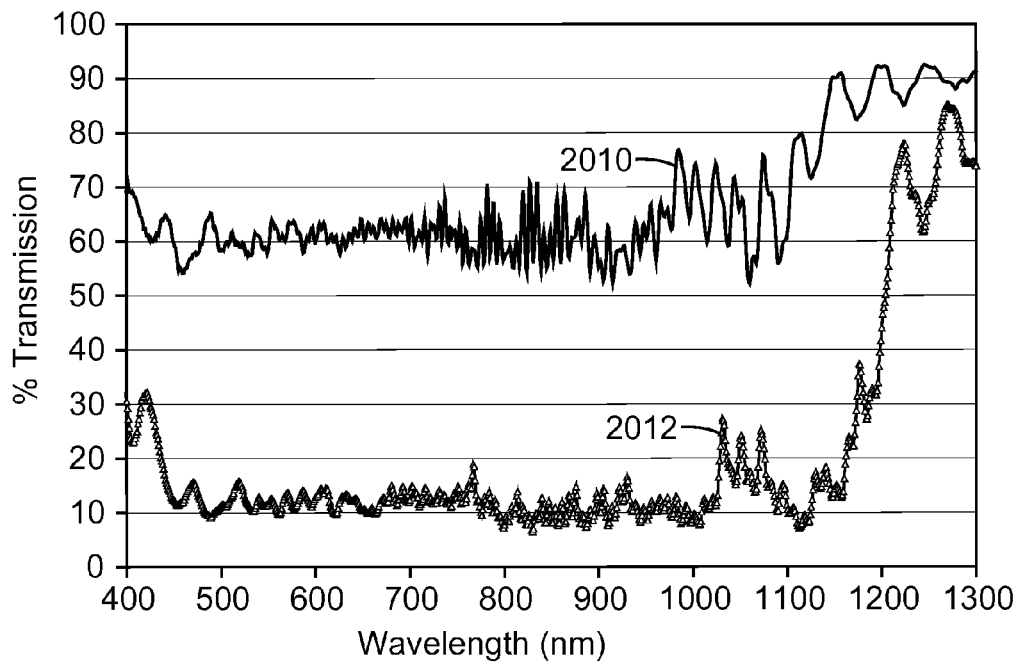
FIGS. 20a-b are graphs of transmission versus wavelength data for a film example.

Polarized transmission spectra were obtained from one of the thickest parts of the film for both the block and pass axes at normal incidence and at 60 degrees angle of incidence using a diode array spectrophotometer that was fitted with a Glan-Thompson polarizing prism. The block (curve 2012) and pass (curve 2010) axis spectra at normal incidence are plotted in FIG. 20*a*. The red bandedges for the block and pass axis at normal incidence are approximately 1160 nm and 1100 nm. The left bandedge of the block axis can be clearly seen in the figure to be at about 445 nm. This film will transmit some blue light at normal incidence and these parts were rejected in favor of slightly thinner film parts with left bandedges below at least 425 nm for later measurements.

Figure 20B:
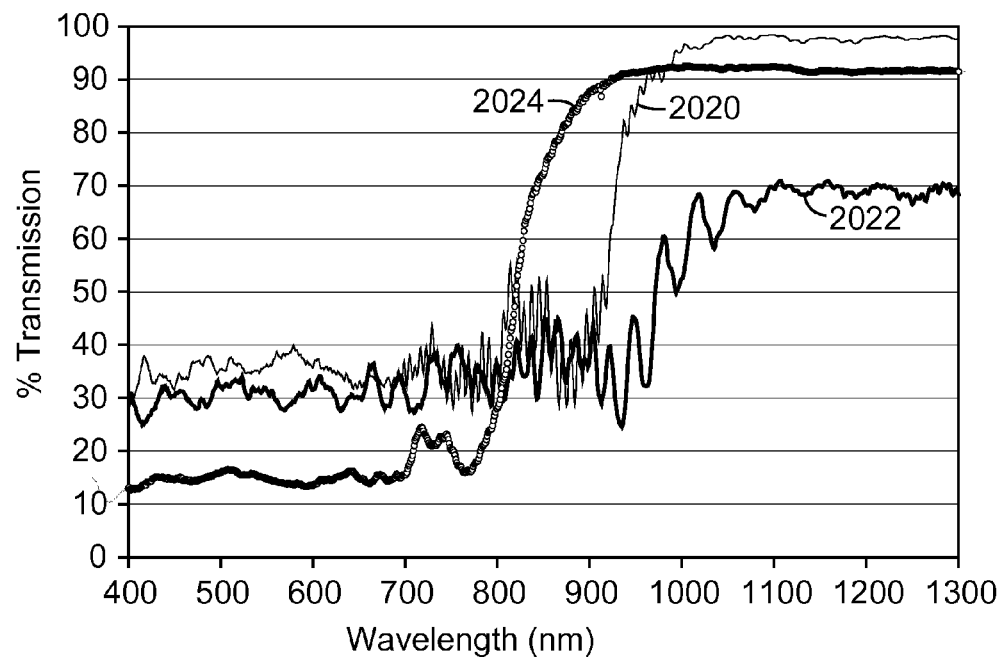

Transmission measurements at 60 degrees in air for the s-pol (curve 2022) and p-pol (curve 2020) spectra of this film are shown in FIG. 20*b*. Afterwards, the same piece of film was laminated between 90 degree prisms of BK-7 glass ($n_d$=1.517 and n≈1.515 at 633 nm) with an index matching fluid to form a cube with the film along the diagonal. The film was rotationally oriented so that the p-polarized pass axis spectrum could be measured at 45 degrees with an immersion index of 1.517. This spectrum is also plotted in FIG. 20*b*, as curve 2024. The angle at 45 degrees to the film in the prisms is greater than 90 degrees from air and equivalent to about 63 degrees in a film of index 1.2.

The red bandedges for the pass axis 60 deg s-pol and p-pol spectra in air are approximately 970 nm and 920 nm respectively, and 790 nm for the p-pol spectrum at 45 degrees in the BK7 glass cube. The average transmission for each spectra from 400 nm to its red band edge (450 to the RBE for the block axis spectrum) are as follows: Block=12%, pass=62%, T s-pol 60=33%, T p-pol 60=37%, T p-pol 45-prism=12.3%. The reflections from the air interfaces can be subtracted, knowing that the skin layers have an index of 1.564. The formula is: T internal=1-(1-R-(1+R)*T)/(1-R-2*R*T), where R is the reflectivity at each of the two film surfaces and T is the measured total transmissivity of the film. The calculated values are: Tblock=12%, T00=66%, and T60Air s-pol=39% and T60Air p-pol=37%. For the glass prism, the surface reflections are 4.2% at each face, giving a calculated internal transmission of the film equal to 17.5%, or R internal=82.5%. These properties of Optical Film 3.1 are summarized in the following table:

TABLE

Optical Film 3.1 Properties

|  | RBE (nm) | Avg % T in band | Internal % T | T60/Tpass |
|---|---|---|---|---|
| Block | 1160 | 12 | 12 |  |
| Pass | 1100 | 62 | 66 |  |
| T60 s-pol | 970 | 33 | 39 | 0.59 |
| T60 p-pol | 920 | 37 | 37 | 0.56 |
| T45 prism | 790 | 12 | 17.5 |  |

Portions of this film that were stretched thinner due to non-uniformities in the batch process exhibited slightly higher reflectivities for all measurements and of course lower red band edges. For example, much of the film exhibited a red band edge of 1100 nm for the block axis, and the average % T was only 10% and values of T60 p-pol as low as 32% were measured. These compare to 12% and 38% of the film described above with the 1060 nm RBE. Improved uniformity in the orientation conditions and therefore the caliper and the reflection values can be achieved by orienting the film in a continuous fashion on a commercial film line.

Optical Film 3.2: 2-Axis Collimating Film, 275 Microlayers×2 Packets (IV)

This film example was made in the same manner as Optical Film 3.1 with the exception that the casting wheel speed was increased by 25%, resulting in a film that is 20% thinner. As a result all of the red band edges were decreased by about 20%. These thinner films also stretched more uniformly on the Karo IV machine than the thicker cast web, resulting in a RBE for the block axis of about 875 nm to 925 nm over most of the film area. These films will begin to transmit red and yellow light rays that are propagating at very high angles in the low index layers. The spectra for this film all have average transmission levels which are similar to those of Optical Film 3.1.

If the reflection band had been compressed by changing the layer thickness profile instead of just shifting it towards the ultra violet, then the transmission values could have been reduced compared to that of Optical Film 3.1.

Optical Film 3.3: 2-Axis Collimating Film, 275 Microlayers×2 Packets (V)

In the process of making Optical Film 3.3, a cast web of a multilayer construction of alternating low and high index polymers was extruded onto a chilled casting wheel for in-line biaxial orientation on a sequential film orientation line. Using a feedblock method (see e.g. U.S. Pat. No. 6,783,349 (Neavin et al.)), a reflective polarizer of alternating low and high index polymer layers was made by co-extruding a cast web of 275 layers of alternating low and high index polymer materials and subsequently orienting the cast web, first in a length orienter (LO), then in a tenter. The high index layers were made with a 90/10 coPEN (a copolyester containing 90% ethylene naphthalate repeat units and 10% ethylene teraphthalate repeat units). The low index layers were made by blending in the extruder a mixture of 55% by weight of PETg GN071 (available from Eastman Chemicals) with 45% by weight of the 90/10 coPEN. 15% of the low index material was diverted from the melt train to form the protective boundary layers during the coextrusion process (7.5% to each side of the 275 layer extrudate). Skin layers of 90/10 coPEN were applied to the melt flow, immediately preceding the extrusion die, at a rate of 20% of the total melt flow, 10% to each side of the film. The target refractive indices for the high index layers of the film were nx=1.79, ny=1.675, nz=1.505. Development of these indices requires an asymmetric orientation of the film.

For the length orientation, the LO preheat rollers were heated to 102° C. The final heating just before the stretch gap was applied using a quartz lamp. The actual stretch temperatures are not measurable except in terms of the index of refraction in the coPEN achieved by the process. The IR lamp was adjusted while simultaneously adjusting the tenter conditions until the indices of nx=1.793, ny=1.671, nz=1.502 were measured on the skin layers. The LO overall stretch ratio was 2.7:1 and the overall tenter stretch ratio was 4.5:1.

The LO'd film was preheated in the tenter for about 13 sec at about 140° C. The film was then stretched at 132° C. at an initial rate of about 50%/sec. The film was then heat set for 13 seconds at 232° C. while towing in about 2% of the width.

The relative extrusion rates of the low and high index materials in each packet of layers were adjusted so that adjacent material layers in the finished film would each have approximately the same optical thickness. The extrusion rates for both the low and high index material were adjusted so that both sets of layers each had about a quarterwave optical thickness for the block axis that is tuned to reflect from about 425 nm for the thinnest layers and increasing in thickness monotonically in a power law profile to reflect about 1200 nm light for the thickest layers of the film. The extrusion casting wheel speed was adjusted so that the resultant reflection band spanned this wavelength range. The shape of the power law profile was chosen so that the resultant spectra were relatively flat across most of the spectrum for each packet. The spectral shape was fine tuned using the axial rod technique outlined in U.S. Pat. No. 6,783,349 (Neavin et al.). In the final oriented film, the skin layers were each about 6 microns thick. The total finished film thickness was about 45 microns thick. Two of the resultant films made by this method were then laminated using a clear optical adhesive. The pass axes of the two films in the laminate were parallel. The transmission spectra were measured using the diode array spectrophotometer at normal and 60 degrees. The red band edges and the % transmission values were determined from those spectra and are listed in the table below. The ratio of T($\theta$=60$_{air}$ p-pol)/Tpass (0) is lower than for Optical Film 3.1.

TABLE

Optical Film 3.3 Properties

|  | RBE (nm) | Avg % T in band | Internal % T | T60/Tpass |
| --- | --- | --- | --- | --- |
| Block | 1200 | 12.2 | 12.3 |  |
| Pass | 1150 | 56.5 | 60.1 |  |
| T60 s-pol | 970 | 29.7 | 34.3 | 0.57 |
| T60 p-pol | 950 | 31.7 | 31.9 | 0.53 |

Optical Film 3.4: 1-Axis Collimating Film (s-Pol), 275 Microlayers

Cast web of a multilayer construction of alternating low and high index polymers was extruded onto a chilled casting wheel for in-line tenter orientation on a film line. Using a feedblock method (see e.g. U.S. Pat. No. 6,783,349 (Neavin et al.)), a reflective polarizer of alternating low and high index polymer layers was made by co-extruding a cast web of 275 layers of alternating low and high index polymer materials and subsequently orienting the cast web, first in a length orienter (LO), then in a tenter. The high index layers were made with a 90/10 coPEN (10% PET). The low index layers were made with Ecdel polymer FN007 (available from Eastman Chemicals). 15% of the high index material was diverted from the melt train to form the protective boundary layers during the coextrusion process (7.5% to each side of the 275 layer extrudate). Skin layers of PETg 14285 (available from Eastman Chemicals) were applied to the melt flow, immediately preceding the extrusion die, at a rate to provide finished skin layers of about 8 microns thickness on each side of the film. The target indices for the high index layers of the film were nx=1.82, ny=1.62, nz=1.51. The Ecdel has an index of about 1.505 and the PETg has an index of about 1.564 at 633 nm.

The relative extrusion rates of the low and high index materials in each packet of layers were adjusted so that adjacent material layers in the finished film would each have approximately the same optical thickness. The extrusion rates for both the low and high index material were adjusted so that both sets of layers each had about a quarterwave optical thickness for the block axis that is tuned to reflect from about 400 nm for the thinnest layers and increasing in thickness monotonically in a power law profile to reflect about 950 nm light for the thickest layers of the film. The extrusion casting wheel speed was adjusted so that the resultant reflection band spanned this wavelength range. The shape of the power law profile was chosen so that the resultant spectra were relatively flat across most of the spectrum. The spectral shape was fine tuned using the axial rod technique outlined in U.S. Pat. No. 6,783,349 (Neavin et al.). In the final oriented film, the skin layers were each about 6 microns thick. The total finished film thickness was about 45 microns thick.

The cast web was oriented in a standard film making tenter. The cast web was preheated in the tenter for 20 sec at about 144° C. The film was then stretched at 144° C. at an initial rate of about 50%/second. The total overall stretch ratio in the x direction was about 5.5:1. The film was then heat set for about 20 seconds at 227° C. while towing in about 1% of the width.

Figure 21:
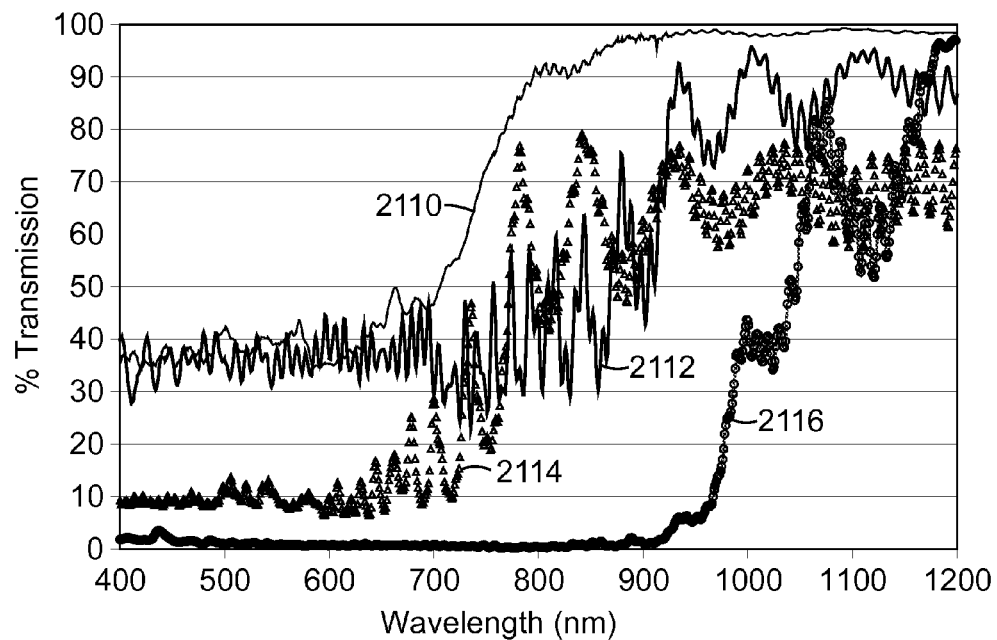
FIG. 21 is a graph of transmission versus wavelength for another film example.

The block (curve 2116), pass (curve 2112), s-pol 60 (curve 2114), and p-pol 60 (curve 2110) spectra for the resulting film are plotted in FIG. 21. The long wavelength bandages (red bandages or RBE) and the average transmission within each plotted reflection band, are listed in the table below. The ratio of T s-pol ($\theta$=60 degAir)/Tpass(0) for this Optical Film 3.4 is 0.29.

TABLE

Optical Film 3.4 Properties

|  | RBE (nm) | Avg % T in band | Internal % T | T60/Tpass |
| --- | --- | --- | --- | --- |
| Block | 970 | 1.4 | 1.4 |  |
| Tpass(0) | 870 | 37.6 | 39.1 |  |
| T60 s-pol | 725 | 10.8 | 11.3 | 0.29 |
| T60 p-pol | 700 | 39.4 | 39.8 | 1.02 |

Construction 1.1: Laminated LCD Panel/Air-Guide

The Optical Films 3.1 through 3.4 were each laminated to a Samsung LCD TV panel. The panel was from Samsung commercial TV set (model#: LN32B360C5D), with the diagonal size of 32". In the experiments, only a portion of the 32" panel was illuminated by a 200 mm×400 mm backlight behind the panel.

Figure 22:
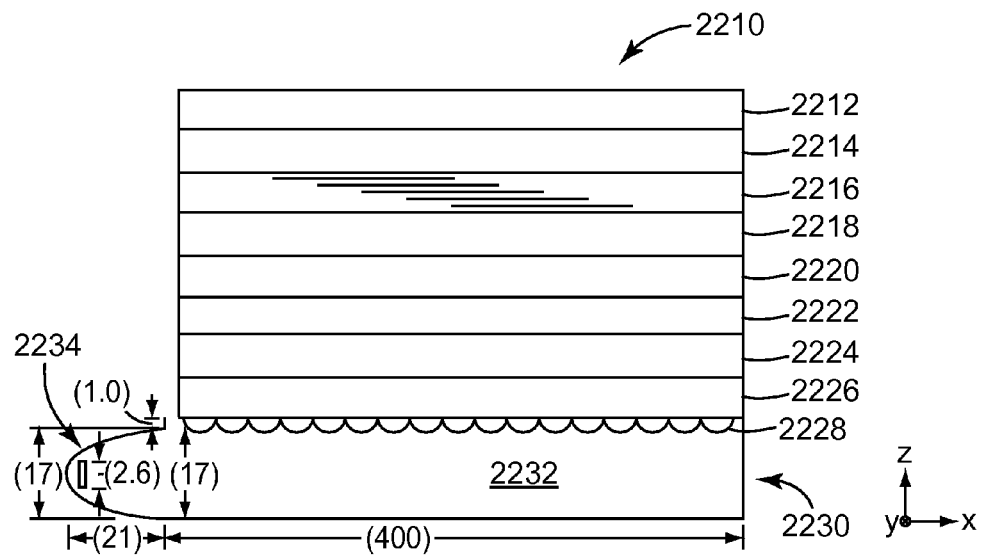
FIG. 22 is a schematic side view of a combined display panel/backlight laminate.

A schematic side-view of this backlight 2210 is shown in FIG. 22. In the figure, dimensions (in units of millimeters) are provided in parentheses. A light engine with white LEDs and parabolic-like reflectors, see item 2234, are attached to the left of the hollow cavity. The inside of the light engine and the cavity are lined with ESR (available from 3M Company) if not otherwise specified. The hollow cavity 2232 is 17 mm deep, 200 mm wide and 400 mm long. 20 cool white Rebel LEDs (available from Philips Lumileds Lighting Company, San Jose, Calif., USA) were arranged on a linear array along the left edge (the 200 mm edge) with the pitch of 9.8 mm on metal core printed circuit boards (MCPCB), which were then attached to extruded aluminum heat sinks for thermal management.

The luminance of the backlight center as a function of viewing angle, axial luminance (in units of nits), the half-luminance angle, and contrast ratio were measured using an Autronic Conoscope Conostage 3 (available from Autronic-Melchers GmbH, Karlsruhe, Germany).

In all experimental examples, the reflective polarizers were arranged such that their block axis was parallel to the 400 mm edge of the backlight. The films were laminated to the TV panel according to the schematic diagram in FIG. 22. In the figure, item 2212 is the LC panel, 2214 is an optical adhesive, 2216 is the multilayer optical film being tested, 2218 is an optical adhesive, 2220 is a layer of PET, 2222 is a layer of ULI material, 2224 is an optical adhesive, 2226 is a polycarbonate film, and 2228 is bead coating, similar to a beaded gain diffuser film.

As a control sample to compare the TV performance using a non-immersed film system, the TV brightness and contrast was first measured on this Samsung TV panel using this backlight but with an air gap between the panel and the film stack. For rigidity, the film stack was laminated to a clear polycarbonate sheet in the position where the panel 2212 is depicted in FIG. 22. The TV panel was then positioned approximately 1 mm above the clear polycarbonate sheet. The brightness and contrast of the TV were obtained by the Autronics instrument for all polar angles out to 80 degrees at all azimuthal angles from 0 to 360 degrees. This data can be summarized by plotting the brightness and contrast for light exiting the TV along the two major axis of the polarizing film—the block and pass axis. The pass axis of the reflecting polarizer is of course aligned with pass axis on the adjacent absorbing polarizer of the TV panel.

Substantially only pass axis p-polarized light enters the TV in the plane of incidence of the pass and normal axes, so this data is plotted as brightness and contrast for p-polarized light. Similarly, only pass axis s-polarized light enters the TV in the plane of incidence of the block and normal axes, so this data will be plotted as brightness and contrast for s-polarized light. As indicated by the data presented below, the TV brightness and contrast is greatly affected by the transmission characteristics of the reflective polarizer for s and p-polarized light as a function of angle and value of the polarizer bandwidth. The bandwidth is represented by the value listed for the long wavelength band edge, or red bandedge (RBE).

Figure 23A:
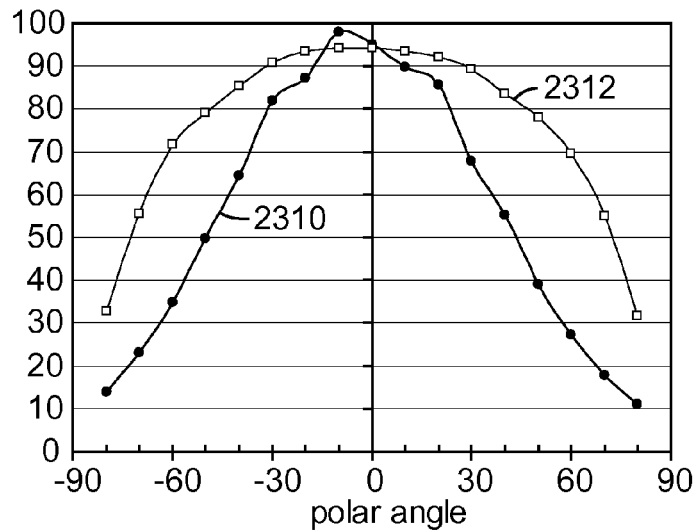
FIGS. 23a-j are plots of contrast and brightness for various laminate embodiments.
Figure 23B:
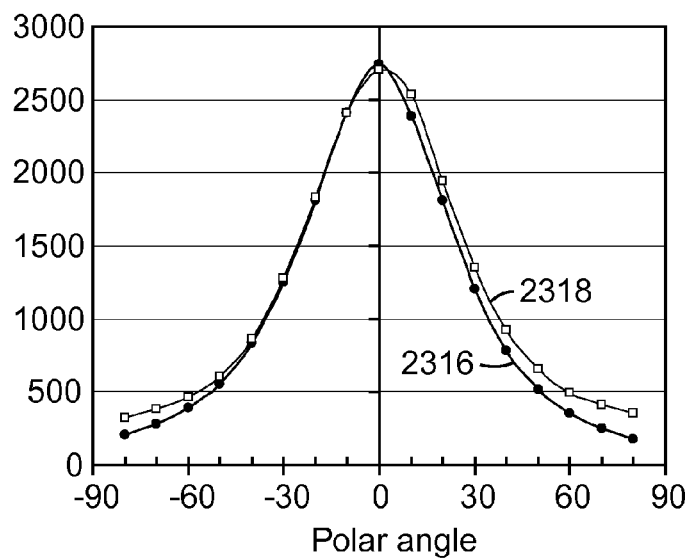

The reflective polarizing film used for the control sample was the Optical Film 3.4, which is referred to as an s-pol collimating film. The brightness and contrast of the TV for the two major axes, representative of s-polarized (curves 2310, 2316) and p-polarized (curves 2312, 2318) light are plotted in FIGS. 23a and 23b, respectively. The brightness units are only relative, and will be used for comparing the various samples described here. A half luminance viewing angle can be defined as the polar angle at which the brightness drops to half of the brightness value that is measured on-axis (0 degrees). This viewing angle is typically different for the block and pass axes.

The contrast data is a ratio of the TV brightness in the "on", or "white" state divided by the panel brightness in the "off" or "dark" state. It is known that high angle light that enters the TV panel can degrade the contrast of the TV panel due to the scattering of this light by the various pixel elements within the LCD panel. The light scattering is typically lowest for light entering at normal incidence. For this reason, it is desirable to limit the amount of light entering the LCD panel at high angles. When the air gap is eliminated between the diffuser and the TV panel, light can be injected into the panel at angles greater than can enter from air, thus seriously degrading the panel contrast. The films described here, in combination with the ultra low index film layer, are designed to reduce the amount of light entering the panel at these extreme angles.

Figure 23C:
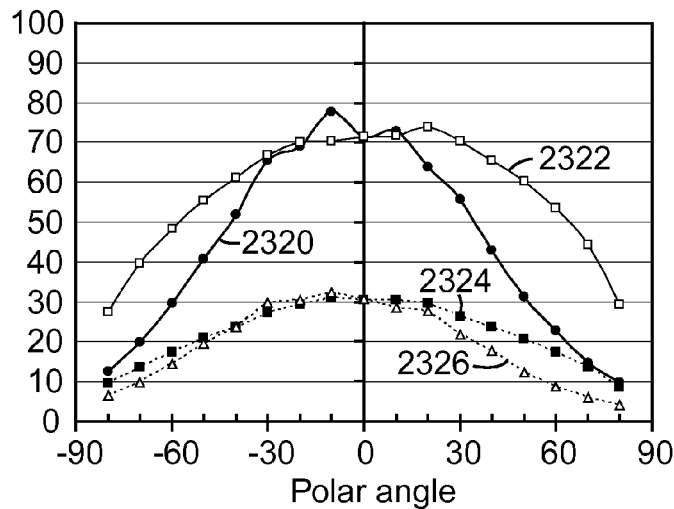
Figure 23D:
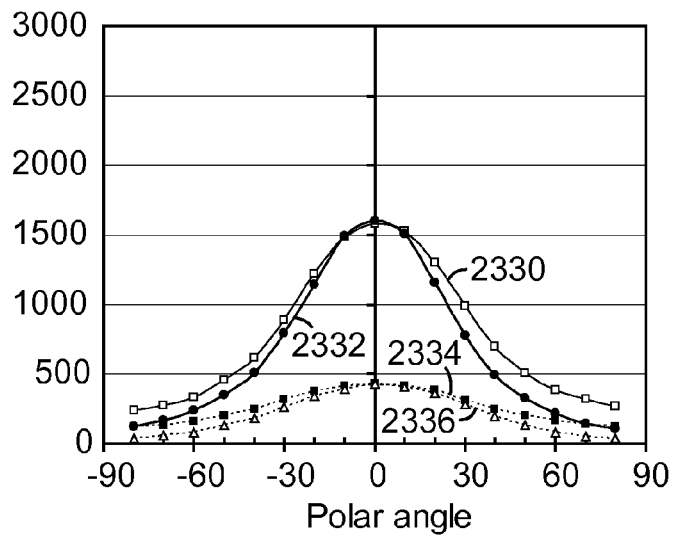

When the Optical Film 3.4, which was designed for use in air, is immersed by laminating the film stack to the TV panel as shown in FIG. 22, both the brightness and contrast are substantially reduced. This is evident from the measurements which are plotted in FIGS. 23c (brightness) and 23d (contrast). In these figures, curve 2320 represents s-pol with ULI, curve 2322 represents p-pol with ULI, curve 2324 represents p-pol without ULI, curve 2326 represents s-pol without ULI, curve 2330 represents p-pol with ULI, curve 2332 represents s-pol with ULI, curve 2334 represents p-pol without ULI, and curve 2336 represents s-pol without ULI. Note also the additional substantial reduction in brightness and contrast when the film is applied without the low index layer. However, the low index layer cannot block all of the high angle light by the TIR mechanism. Light propagating in an index 1.2 layer at angles from 56.4 degrees to 90 could not enter from air, but are not TIR'd by the low index layer. The light in this angle range, i.e. the "gap" range referred to earlier, can be substantially reflected by the reflective polarizer if it is designed to have high reflectivity for pass axis light at these angles.

Figure 23E:
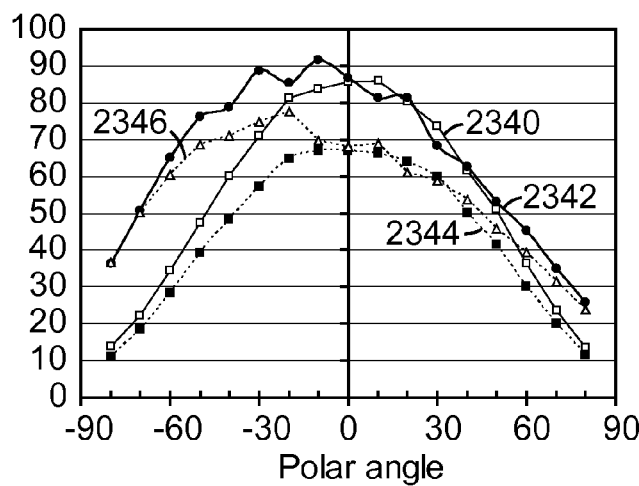
Figure 23F:
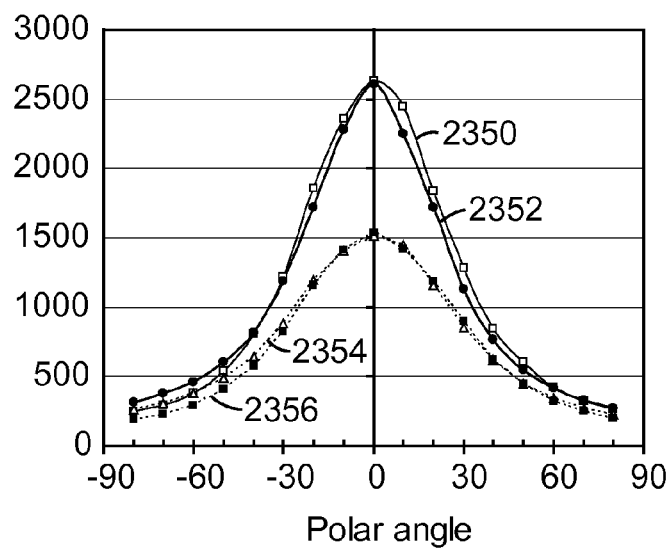

The Optical Film 3.3 has the widest bandwidth of the four films 3.1-3.4, and also the highest average of s-pol and p-pol reflectivity at high angles. When Optical Film 3.3 is laminated to the LCD panel in the same manner as above, the TV brightness and contrast are only slightly reduced from the construction with an air gap. This is evident from the data plotted in FIGS. 23e (brightness) and 23f (contrast). In these figures, curve 2340 represents p-pol with ULI, curve 2342 represents s-pol with ULI, curve 2344 represents p-pol without ULI, curve 2346 represents s-pol without ULI, curve 2350 represents p-pol with ULI, curve 2352 represents s-pol with ULI, curve 2354 represents s-pol without ULI, and curve 2356 represents p-pol without ULI.

The asymmetry in the brightness data for negative vs. positive angles is thought to be due to the nature of the backlight used for these measurements. All of the LEDs are placed along one edge and directed so as to inject light at high angles. The bead coating on the bottom of the film is intended to randomize the directionality of this light, but is not quite sufficient. However, note that the contrast is essentially independent of direction. The asymmetry is quite pronounced for the examples laminated without the low index layer, thus showing the great advantage of combining the low index layer with these films.

Figure 23G:
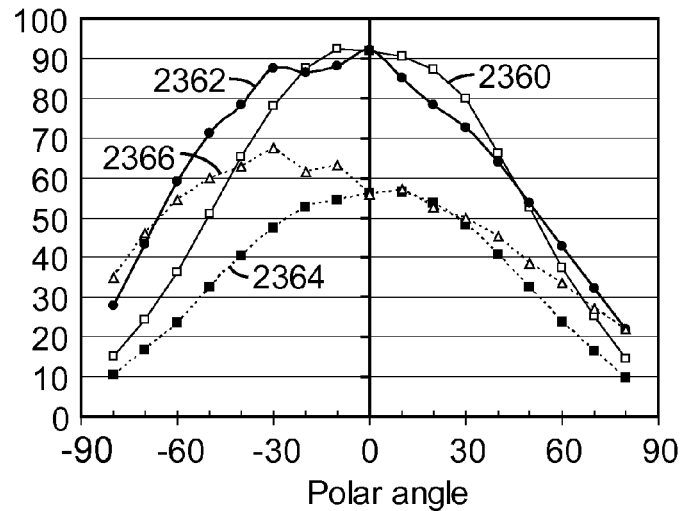
Figure 23H:
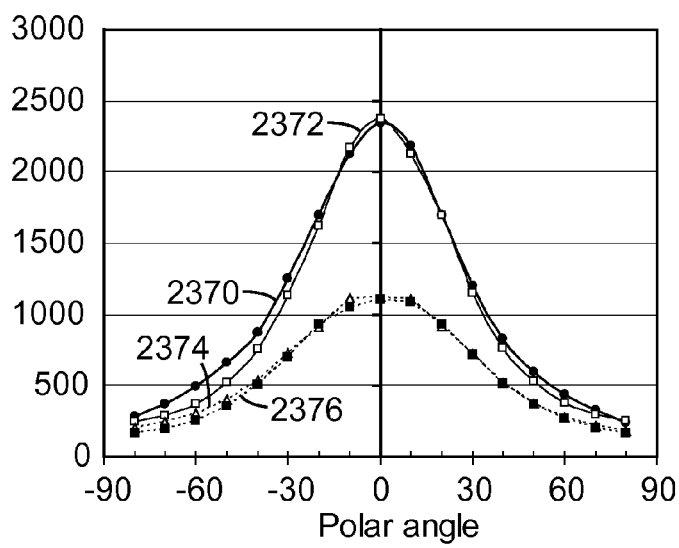

The Optical Film 3.1 has a slightly lower RBE than Optical Film 3.3. The average bandage of Optical Film 3.1 was only about 1130 nm compared to 1200 nm for Optical Film 3.3. When the Optical Film 3.1 is laminated to the LCD panel, the contrast is slightly lower compared to Optical Film 3.3. However, the brightness is improved. This may be due to the lower block state transmission of Film 3.1 compared to Film 3.3. As was noted above, the average RBE and Tblock were both lower for most of the film area than the numbers reported simply from the one set of spectrum taken at a single point on the film. The lower value of Tblock is important for brightness, especially for cases where Tpass is also low. The large degree of light recycling with these systems can magnify the losses many times compared to a one-pass transmission measurement. The contrast and brightness results are shown in FIGS. 23g (brightness) and 23h (contrast). In these figures, curve 2360 represents p-pol with ULI, curve 2362 represents s-pol with ULI, curve 2364 represents p-pol without ULI, curve 2366 represents s-pol without ULI, curve 2370 represents s-pol with ULI, curve 2372 represents p-pol with ULI, curve 2374 represents s-pol without ULI, and curve 2376 represents p-pol without ULI.

Figure 23I:
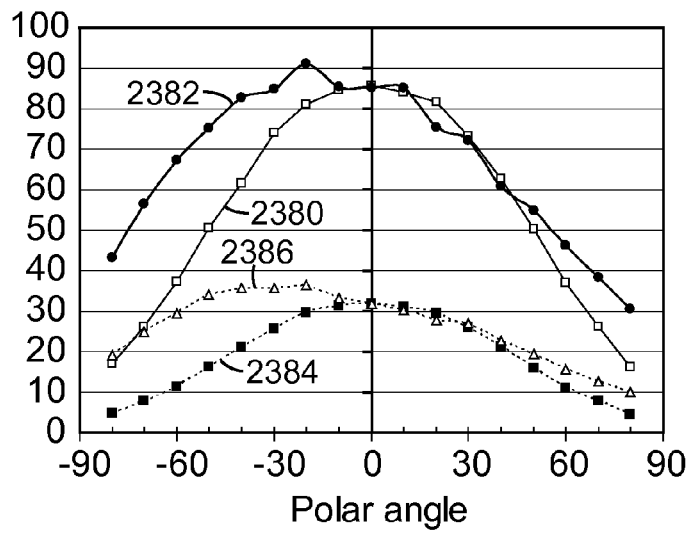
Figure 23J:
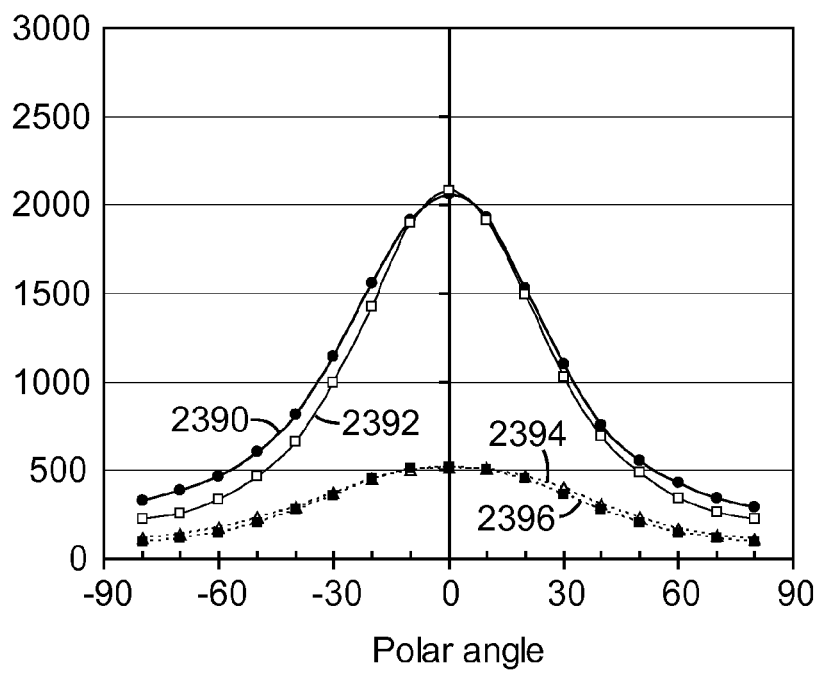

Optical Film 3.2 is made with the same process and materials as Optical Film 3.1, but with an intentionally shifted reflection band. The RBE is shifted towards the blue, making it less effective at reflecting light which is incident at high angles. As a result, both the brightness and contrast of the TV panel is reduced when Optical Film 3.1 is replaced with Optical Film 3.2 on the TV panel, most notably when the low index layer is omitted. These data are plotted in FIGS. 23i (brightness) and 23j (contrast). In these figures, curve 2380 represents p-pol with ULI, curve 2382 represents s-pol with ULI, curve 2384 represents p-pol without ULI, curve 2386 represents s-pol without ULI, curve 2390 represents s-pol with ULI, curve 2392 represents p-pol with ULI, curve 2394 represents s-pol without ULI, and curve 2396 represents p-pol without ULI.

Several of the film parameters for each of Films 3.1-3.4 are listed in Table C below along with the corresponding brightness and contrast for each configuration. The T60s/T(0) and T60p/T(0) values refer to measurement in air at 60 and 0 degrees, and are corrected to report the internal transmission values. These values are taken from the tables associated with each example. The results are listed in order according to the measured TV contrast.

TABLE C

|  | Control/ air | Film 3.3 | Film 3.1 | Film 3.2 | Film 3.4 |
|---|---|---|---|---|---|
| RBE | 970 | 1200 | 1130 | 900 | 970 |
| T60s/T(0) |  | 0.57 | 0.59 | 0.59 | 0.29 |
| T60p/T(0) |  | 0.53 | 0.56 | 0.56 | 1.02 |
| Avg T60/T(0) |  | 0.55 | 0.575 | 0.575 | 0.655 |
| Brightness with ULI | 94 | 86 | 92 | 85 | 71 |
| Brightness without ULI |  | 68 | 56 | 32 | 31 |
| Contrast with ULI | 2710 | 2600 | 2360 | 2075 | 1600 |
| Contrast without ULI |  | 1520 | 1100 | 516 | 431 |

The fact that Optical Film 3.2, with a RBE of only 900 nm provides for both higher brightness and contrast than Optical Film 3.3 which has a RBE of 970 nm indicates that both RBE and the reflectivity at high angles are important parameters.

Figure 24:
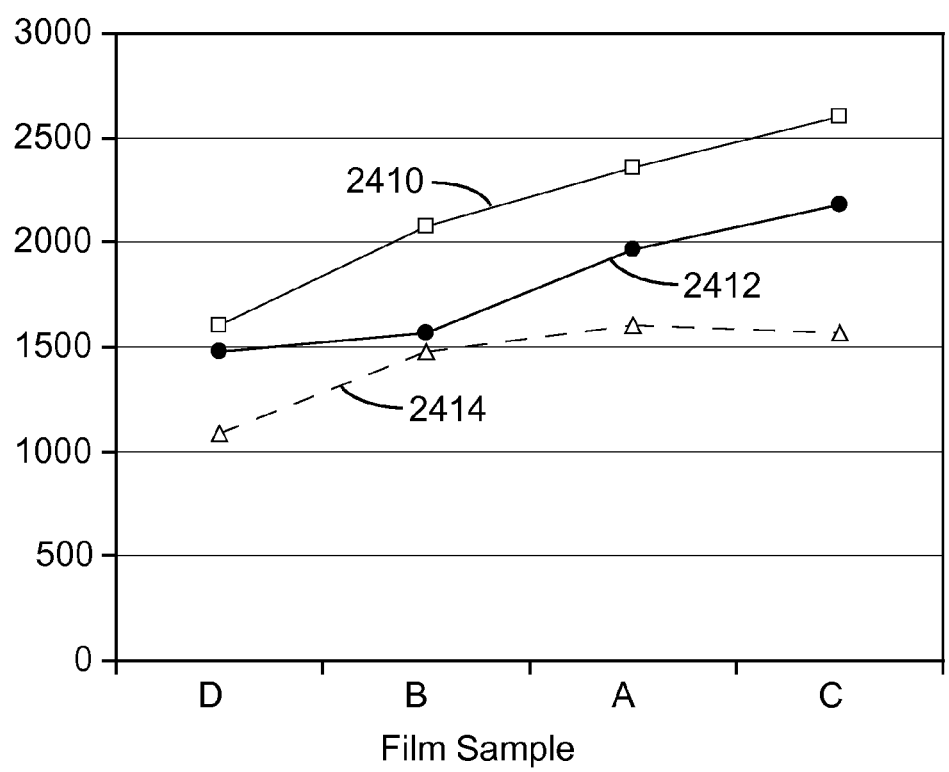
FIG. 24 is a graph of summary information for four different film samples.

To better understand the combined effect of RBE value and the T60/T(0) ratio, the contrast values (curve 2410), the product of RBE*T(0)/T60 (curve 2412), and the relative brightness*T(0)/T60 (curve 2414) are all plotted vs. film sample (A representing Optical Film 3.1, B representing Optical Film 3.2, C representing Optical Film 3.3, and D representing Optical Film 3.4) in FIG. 24 in the order of increasing contrast. The brightness is scaled by a factor of 10 simply for convenience in plotting the information. The nearly parallel trends of these parameters indicate that both increased RBE and higher reflectivity for high angle light are important for maintaining a high contrast and brightness in the LCD panel.

Discussion

Laminates with Immersed Reflective Polarizing Film and no Ultra-Low Index Layer

The shift in the reflection band to lower wavelengths with increasing angle of propagation becomes quite large when the film is immersed in higher index media. For example, in U.S. Patent Application Publication US 2008/0037127 (Weber), "Wide Angle Mirror System", it is noted that when the z-index of all layers of the mirror are close to the index of the immersing medium, the RBE will shift to about zero nm at high angles for p-polarized light, no matter what the bandage at normal incidence. This potentially infinite bandshift thus requires the use of a TIR layer of a very low index to block high angle rays of light. The s-pol reflecting Optical Film 3.4 is an example with the z-index of both layers having an index of 1.505. If this film were immersed between a standard diffuser and TV panel, using a standard adhesive with n≈1.49, then the dramatic movement of the reflection band would allow large amounts of light to transmit at high angles. However, if only the low index layer were changed to one with an index of e.g. 1.58, then the shift in the RBE with angle of incidence is greatly reduced. The high index layer need not be changed, indeed, it requires a much lower z-index than the low index layer if the film is to perform as a wide angle polarizer and if p-polarized light is to be reflected at high angles.

Thus we have discovered that reflective polarizers which are designed to reflect most block axis light and p-polarized pass axis light at high angles do not exhibit prohibitively large bandshifts with changes in the angle of incidence. The bandshift is finite for the film and immersion indices discussed here and indeed one that can be compensated for by the addition of a reasonable number of layers that extend the bandwidth of the polarizer to a degree that an ultra low index layer is not needed to reflect the light at the highest angles. On the other hand, multilayer birefringent reflective polarizers that are designed to transmit p-polarized pass axis light and substantially reflect s-polarized pass axis light will generally require an ultra low index layer to perform when immersed in a high index medium.

Example NU-1

Immersed Film with No Ultra Low Index Layer

If the index set of the reflective polarizer is ($n_x$=1.80, $n_y$=1.67, $n_z$=1.505) for the "high" index layers and n=1.585 for the "low" index layers, the right band edge for p-pol light does not drop below about 600 nm if the film is immersed in an index of 1.49. These film indices can be obtained with an asymmetrical biaxial orientation and heat setting of a PEN or a coPEN film having a very high PEN content, e.g. 95% PEN or greater. A ratio of orientation for the block axis to the pass axis direction can be about 2:1, although one can easily vary this ratio to optimize the nx vs. ny index. The low index material can be made using a blend of, e.g., PETg and a coPEN. All s-polarized visible light is reflected and p-polarized light below 650 nm is reflected at angles up to about 77 degrees.

Using the suggested indices and materials listed above for this example, a continuously graded stack of 550 alternating layers of the low and high index materials can be designed to give a high reflectivity polarizer for wavelengths from 400 nm to at least 1800 nm. Alternatively, two films that are designed to reflect from e.g. 400 to 900 nm and from 850 to 1800 nm can be laminated or co-extruded to form an ultra wide reflective polarizer that can be immersed in normal adhesive bonded films. The lowest indices in typical LCD panel and backlight components are generally in an adhesive layer. Many adhesives have indices close to 1.48 or 1.49. Some may be lower, such as silicone based adhesives. Diffuser plates, light guides and diffuser coatings and other media in which this film may be immersed have indices of 1.49 or higher. The lowest index layer in the immersion stack determines the effective immersion constant. For this reason, at least one layer in the film laminate should have an index of 1.49 or lower.

1800 nm can be chosen as the red bandage for the pass axis at normal incidence because such a bandwidth of 400 nm to 1800 nm is achievable with a practical number of layers, such as about 500 layers for PEN based polymer films and about 1000 to 2000 layers for PET based films. Most lighting and display backlights utilize visible light with wavelengths mostly less than 650 nm. Although some red light will leak through at the highest angles, the percentage of light incident above 80 degrees is generally small. Bandages of 1600 to 2000 nm will work well for a wide range of applications.

Example NU-2

PETg/coPEN 90-10 Ultra Wide Band Polarizer

In order to demonstrate that an optical film can be made with the ultra wide bandwidths described in Example NU-1, and with an acceptable level of uniformity of transmission vs. wavelength over such a wide band, the following two films were made and then laminated with an optical adhesive. The first film reflects from about 400 nm to 900 nm and the second film reflects from about 800 nm to 1800 nm. The bandedges were designed to be gradual in order that the transitional overlap in the spectra from one film to the other in the laminate is relatively smooth. Both films were made using a feedblock method such as that described in U.S. Pat. No. 6,783, 349 (Neavin et al.) with 275 alternating layers of a 90/10 coPEN (90% PEN/10% PET) and PETg (available from Eastman Chemicals, Tennessee). The first film was optimized for uniformity of transmission and bandage slopes, with bandages of about 400 and 900 nm. The extrusion casting wheel was then slowed down by a factor of 2 so that the 400 nm bandage was moved out to 800 nm and the 900 nm bandage moved out to 1800 nm.

The wavelength range of overlap of the two films, between about 800 to 900 nm for the pass axis, exhibited some spectral ringing due to interference effects between the two films, but the spectrum acceptably smooth. This ringing and the other spectral non-uniformities evident in the spectrum will cause the transmitted light to be slightly colored. This color can be masked by the use of a moderate diffuser on the exit side of the film. This diffuser could be part of a prism array or other surface structure for further collimating the transmitted light.

The laminated film requires some overlap of the reflection bands of the two separate films and is therefore not quite as efficient as a single film made from one continuously graded stack of 550 layers. However this approach is simpler from a process standpoint since it is difficult and expensive to make a feedblock that can generate 550 alternating ¼ wave thick layers with a continuous gradient and no intervening thick layers. The least effective optical design is a stack of two or more films that are partially reflective over the entire wavelength range. The non-coherent interference effects between separate reflectors will increase the pass axis reflectivity and decrease the block axis reflectivity compared to the coherent stacks described above.

The high angle reflection of this polarizer for s and p-polarized light will not be quite as good as for Example NU-1 above. The index set for this film (at 633 nm) was: high index layer (nx=1.82, ny=1.62, nz=1.51), low index layer is PETg with n=1.564. However, note that Δny and Δnz are both greater than 0.05. The pass axis had an external transmission of about 75% from 400 nm to 1000 nm and about 80% from 1000 nm to 1800 nm at normal incidence. The block axis showed a transmission of about 5% for light from 400 nm to 1000 nm and about 8% for light from 1000 nm to 1800 nm at normal incidence. Both of these transmission measurements were made with polarized light which was arranged to be parallel to the axis being measured, as was the case for all the examples.

Item 1 is a film construction, comprising a plurality of microlayers configured to selectively transmit and reflect light as a function of angle and polarization over an extended wavelength region including visible wavelengths, the microlayers defining a pass axis for normally incident visible light of a first polarization and a block axis for normally incident visible light of a second polarization, the microlayers also characterized by increased reflectivity at oblique angles so as to transmit visible light of the first polarization in a compressed viewing cone; and an optically thick low index layer having an ultra low refractive index coupled to the microlayers in such a way as to limit propagation of highly oblique light in the microlayers, or to redirect such highly oblique propagating light back towards the microlayers.

Item 2 is the construction of item 1, wherein the ultra low refractive index, averaged over visible wavelengths, is at least 1.1 but no more than 1.3.

Item 3 is the construction of item 2, wherein the ultra low refractive index, averaged over visible wavelengths, is at least 1.15 but no more than 1.25.

Item 4 is the construction of item 1, wherein the plurality of microlayers has a pass axis, a block axis, and a normal axis, and wherein the plurality of microlayers has an average internal reflectivity over visible wavelengths, as a function of propagation angle $\theta$, of: $RPpass(\theta)$ for p-polarized light incident in a pass plane containing the pass axis and the normal axis; $RSblock(\theta)$ for s-polarized light incident in the pass plane; $RPblock(\theta)$ for p-polarized light incident in a block plane containing the block axis and the normal axis; and $RSpass(\theta)$ for s-polarized light incident in the block plane; wherein $Rblock(\theta)$ is an average of $RSblock(\theta)$ and $RPblock(\theta)$, and $Rpass(\theta)$ is an average of $RSpass(\theta)$ and $RPpass(\theta)$; wherein the plurality of microlayers has an average internal transmission over visible wavelengths, as a function of the propagation angle $\theta$, of: $TPpass(\theta)$ for p-polarized light incident in the pass plane; $TSblock(\theta)$ for s-polarized light incident in the pass plane; $TPblock(\theta)$ for p-polarized light incident in the block plane; and $TSpass(\theta)$ for s-polarized light incident in the block plane; and wherein $Tblock(\theta)$ is an average of $TSblock(\theta)$ and $TPblock(\theta)$, and $Tpass(\theta)$ is an average of $TSpass(\theta)$ and $TPpass(\theta)$.

Item 5 is the construction of item 4, wherein $Tblock(0)$ is less than 20%, and wherein $Tpass(0)$ is in a range from 40% to 80%.

Item 6 is the construction of item 5, wherein $Tblock(0)$ is less than 10%, and wherein $Tpass(0)$ is in a range from 55% to 75%.

Item 7 is the construction of item 5, wherein the propagation angle $\theta$ is an angle $\theta_{air}$ measured in air, and wherein $Tpass(\theta_{air}=60°)<0.85*Tpass(0)$.

Item 8 is the construction of item 7, wherein Tpass($\theta_{air}$=60°)<0.75*Tpass(0).

Item 9 is the construction of item 5, wherein the propagation angle θ is an angle $\theta_{low\ index}$ measured in the optically thick low index layer, and wherein Tpass($\theta_{low\ index}$=90°)<0.6*Tpass(0).

Item 10 is the construction of item 9, wherein Tpass($\theta_{low\ index}$=90°)<0.3* Tpass(0).

Item 11 is the construction of item 1, wherein the plurality of microlayers contain less than 1000 microlayers.

Item 12 is the construction of item 1, further comprising: a first and second optically thick layer arranged such that the optically thick low index layer and the plurality of microlayers are both disposed between the first and second optically thick layers; wherein the first and second optically thick layers have higher refractive indices than that of the optically thick low index layer.

Item 13 is the construction of item 12, wherein the first optically thick layer comprises a light guide.

Item 14 is the construction of item 12, wherein the first optically thick layer comprises a diffusing layer.

Item 15 is the construction of item 12, wherein the first optically thick layer comprises a display panel.

Item 16 is a film construction, comprising a multilayer optical film configured to operate substantially as a reflective polarizer for visible light at normal incidence and to operate substantially as a mirror for visible light at oblique angles; and an optically thick low index layer having an ultra low refractive index attached to the multilayer optical film.

Item 17 is the construction of item 16, wherein the ultra low refractive index, averaged over visible wavelengths, is at least 1.1 but no more than 1.3.

Item 18 is the construction of item 17, wherein the ultra low refractive index, averaged over visible wavelengths, is at least 1.15 but no more than 1.25.

Item 19 is the construction of item 16, wherein the multilayer optical film has a pass axis, a block axis, and a normal axis, and wherein the multilayer optical film has an average internal reflectivity over visible wavelengths, as a function of propagation angle θ, of: RPpass(θ) for p-polarized light incident in a pass plane containing the pass axis and the normal axis; RSpass(θ) for s-polarized light incident in the pass plane; RPblock(θ) for p-polarized light incident in a block plane containing the block axis and the normal axis; and RSblock(θ) for s-polarized light incident in the block plane; wherein Rblock(θ) is an average of RSblock(θ) and RPblock(θ), and Rpass(θ) is an average of RSpass(θ) and RPpass(θ); wherein the multilayer optical film has an average internal transmission over visible wavelengths, as a function of the propagation angle θ, of: TPpass(θ) for p-polarized light incident in the pass plane; TSpass(θ) for s-polarized light incident in the pass plane; TPblock(θ) for p-polarized light incident in the block plane; and TSblock(θ) for s-polarized light incident in the block plane; and wherein Tblock(θ) is an average of TSblock(θ) and TPblock(θ), and Tpass(θ) is an average of TSpass(θ) and TPpass(θ).

Item 20 is the construction of item 19, wherein Tblock(0) is less than 20%, and wherein Tpass(0) is in a range from 40% to 80%.

Item 21 is a film construction, comprising a multilayer optical film configured to operate substantially as a reflective polarizer for visible light at normal incidence and to operate substantially as a mirror for visible light at oblique angles; and wherein the value of RBE*Tpass(0)/Tpass(60)>1500.

Item 22 is a film construction, comprising a multilayer optical film configured to operate substantially as a reflective polarizer for visible light at normal incidence and to operate substantially as a mirror for visible light at oblique angles, the multilayer optical film being characterized by layer-to-layer refractive index differences $\Delta n_x$, $\Delta n_y$, and $\Delta n_y$, and wherein $\Delta n_x \geq 0.10$, $\Delta n_y \geq 0.05$, and $\Delta n_y \leq -0.05$.

Item 23 is the construction of item 22, further wherein the film exhibits a reflection band having a red band edge (RBE), the RBE being disposed at a wavelength of at least 1000 nm.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A film construction, comprising:
  a plurality of microlayers configured to selectively transmit and reflect light as a function of angle and polarization over an extended wavelength region including visible wavelengths, the microlayers defining a pass axis for normally incident visible light of a first polarization and a block axis for normally incident visible light of a second polarization, the microlayers also characterized by increased a pass axis reflectivity at oblique angles that is greater than a pass axis reflectivity for normally incident light so as to transmit visible light of the first polarization in a compressed viewing cone;
  an optically thick low index layer having a refractive index, averaged over visible wavelengths, in a range from 1.1 to 1.3 coupled to the microlayers; and
  a first and second optically thick layer arranged such that the optically thick low index layer and the plurality of microlayers are both disposed between the first and second optically thick layers;
  wherein the first and second optically thick layers have higher refractive indices than that of the optically thick low index layer.

2. The construction of claim 1, wherein the plurality of microlayers has a pass axis, a block axis, and a normal axis, and
  wherein the plurality of microlayers has an average internal reflectivity over visible wavelengths, as a function of propagation angle θ, of: RPpass(θ) for p-polarized light incident in a pass plane containing the pass axis and the normal axis; RSblock(θ) for s-polarized light incident in the pass plane; RPblock(θ) for p-polarized light incident in a block plane containing the block axis and the normal axis; and RSpass(θ) for s-polarized light incident in the block plane;

wherein Rblock(θ) is an average of RSblock(θ) and RPblock(θ), and Rpass(θ) is an average of RSpass(θ) and RPpass(θ);

wherein the plurality of microlayers has an average internal transmission over visible wavelengths, as a function of the propagation angle θ, of: TPpass(θ) for p-polarized light incident in the pass plane; TSblock(θ) for s-polarized light incident in the pass plane; TPblock(θ) for p-polarized light incident in the block plane; and TSpass(θ) for s-polarized light incident in the block plane; and wherein Tblock(θ) is an average of TSblock(θ) and TPblock(θ), and Tpass(θ) is an average of TSpass(θ) and TPpass(θ).

3. The construction of claim 2, wherein Tblock(0) is less than 10%, and wherein Tpass(0) is in a range from 55% to 75%.

4. The construction of claim 3, wherein the propagation angle θ is an angle $\theta_{air}$ measured in air, and wherein Tpass $(\theta_{air}=60°)<0.85*$Tpass(0).

5. The construction of claim 3, wherein the propagation angle θ is an angle $\theta_{low\ index}$ measured in the optically thick low index layer, and wherein Tpass($\theta_{low\ index}=90°)<0.6*$Tpass(0).

6. The construction of claim 1, wherein the first optically thick layer comprises a light guide.

7. The construction of claim 1, wherein the first optically thick layer comprises a diffusing layer.

8. The construction of claim 1, wherein the first optically thick layer comprises a display panel.

* * * * *

UNITED STATES PATENT AND TRADEMARK OFFICE
CERTIFICATE OF CORRECTION

PATENT NO. : 9,158,155 B2
APPLICATION NO. : 13/503320
DATED : October 13, 2015
INVENTOR(S) : Michael F. Weber It is certified that error appears in the above-identified patent and that said Letters Patent is hereby corrected as shown below:

Specification

Column 2,
Line 44, delete "angles" and insert -- angles. --, therefor.

Column 6,
Line 26, delete "Vikuti™" and insert -- Vikuiti™ --, therefor.

Column 12,
Line 1, delete "$\Delta n = n_{1j} - n_{2j}$," and insert -- $\Delta n_j = n_{1j} - n_{2j}$, --, therefor.

Column 19,
Line 61, delete "$\Delta n_x > \Delta n_y > 0 > \Delta n_y$," and insert -- $\Delta n_x > \Delta n_y > 0 > \Delta n_z$, --, therefor.

Column 24,
Line 44, delete "layer;" and insert -- layer. --, therefor.

Column 25,
Line 4, delete "t-axis" and insert -- 2-axis --, therefor.

Column 28,
Line 24, delete "teraphthalate" and insert -- terephthalate --, therefor.

Column 30,
Line 59, delete "teraphthalate" and insert -- terephthalate --, therefor.

Column 32,
Line 38, delete "bandages" and insert -- bandedges --, therefor.
Line 39, delete "bandages" and insert -- bandedges --, therefor.

Signed and Sealed this
Twenty-fourth Day of May, 2016

Michelle K. Lee
*Director of the United States Patent and Trademark Office*

Column 34,
Line 55, delete "bandage" and insert -- bandedge --, therefor.

Column 36,
Line 13, delete "bandage" and insert -- bandedge --, therefor.

Column 37,
Line 13, delete "bandage" and insert -- bandedge --, therefor.
Line 22, delete "Bandages" and insert -- Bandedges --, therefor.
Line 44, delete "bandage" and insert -- bandedge --, therefor.
Line 44-45, delete "bandages" and insert -- bandedges --, therefor.
Line 47, delete "bandage" and insert -- bandedge --, therefor. (both instances)

Column 39,
Line 5, delete "=)90°)" and insert -- = 90°) --, therefor.

Column 40,
Line 4, delete "$\Delta n_y \leq -0.05.$" and insert -- $\Delta n_z \leq -0.05.$ --, therefor.